US011198762B2

(12) United States Patent
Jeon et al.

(10) Patent No.: US 11,198,762 B2
(45) Date of Patent: Dec. 14, 2021

(54) POLYIMIDE, COMPOSITION FOR PREPARING POLYIMIDE, ARTICLE INCLUDING POLYIMIDE, AND DISPLAY DEVICE INCLUDING THE ARTICLE

(71) Applicants: SAMSUNG ELECTRONICS CO., LTD., Suwon-si (KR); SAMSUNG SDI CO., LTD., Yongin-si (KR)

(72) Inventors: Hyunjeong Jeon, Seoul (KR); Sun Jin Song, Seoul (KR); Sunghyun Han, Pohang-si (KR); Won Suk Chang, Hwaseong-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 62 days.

(21) Appl. No.: 16/177,937

(22) Filed: Nov. 1, 2018

(65) Prior Publication Data
US 2019/0135980 A1 May 9, 2019

(30) Foreign Application Priority Data
Nov. 3, 2017 (KR) .................. 10-2017-0146148

(51) Int. Cl.
C08G 73/10 (2006.01)
C08J 5/18 (2006.01)
C09D 179/08 (2006.01)
C08G 73/14 (2006.01)

(52) U.S. Cl.
CPC ....... C08G 73/106 (2013.01); C08G 73/1039 (2013.01); C08G 73/1042 (2013.01); C08G 73/1067 (2013.01); C08G 73/1082 (2013.01); C08G 73/14 (2013.01); C08J 5/18 (2013.01); C09D 179/08 (2013.01); C08J 2379/08 (2013.01)

(58) Field of Classification Search
CPC .... C08G 77/26; C08G 77/455; C08G 73/106; C08G 73/1067
See application file for complete search history.

(56) References Cited

U.S. PATENT DOCUMENTS

| 6,187,874 B1* | 2/2001 | Yoshioka | C09J 163/00 525/423 |
|---|---|---|---|
| 9,221,954 B2 | 12/2015 | Jung et al. | |
| 9,365,694 B2 | 6/2016 | Cho et al. | |
| 9,494,712 B2 | 11/2016 | Seo et al. | |
| 9,580,555 B2 | 2/2017 | Ju et al. | |
| 9,975,997 B2 | 5/2018 | Jeon et al. | |
| 2017/0165879 A1 | 6/2017 | Miyamoto et al. | |

FOREIGN PATENT DOCUMENTS

| JP | 2013 091885 | * | 5/2013 |
|---|---|---|---|
| KR | 1181076 B1 | | 9/2012 |
| KR | 2012-0116841 A | | 10/2012 |
| KR | 2015-0016199 A | | 2/2014 |
| KR | 1489558 B1 | | 1/2015 |
| KR | 2015-0076114 A | | 7/2015 |
| KR | 2016-0002402 A | | 1/2016 |
| KR | 2016-0115770 A | | 10/2016 |
| KR | 2016-0132092 A | | 11/2016 |
| KR | 1704593 B1 | | 2/2017 |
| KR | 2017-0077417 A | | 7/2017 |

OTHER PUBLICATIONS

JP 2013 091885 machine translation (2013).*
Young-Wook Park et al. "Mechanical, Surface, and Thermal Properties of Polyamideimide-Polydimethylsilozane Nanocomposites Fabricated by Sol-Gel Process", Journal of Applied Polymer Science, vol. 91, 1774-1783 (2004).

* cited by examiner

Primary Examiner — Kuo Liang Peng
(74) Attorney, Agent, or Firm — Cantor Colburn LLP

(57) ABSTRACT

A polyimide that is a reaction product of a diamine represented by Chemical Formula 1, a diamine represented by Chemical Formula 2, and a tetracarboxylic dianhydride represented by Chemical Formula 3:

Chemical Formula 1

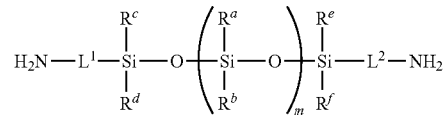

Chemical Formula 2

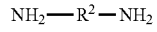

Chemical Formula 3

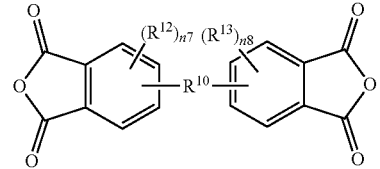

wherein, in Chemical Formulae 1 to 3,
$L^1$, $L^2$, $R^a$ to $R^f$, m, $R^2$, $R^{10}$, $R^{12}$, $R^{13}$, n7, and n8 are the same as defined in the specification.

20 Claims, No Drawings

POLYIMIDE, COMPOSITION FOR PREPARING POLYIMIDE, ARTICLE INCLUDING POLYIMIDE, AND DISPLAY DEVICE INCLUDING THE ARTICLE

CROSS-REFERENCE TO RELATED APPLICATION

This application claims priority to Korean Patent Application No. 10-2017-0146148, filed on Nov. 3, 2017, and all the benefits accruing therefrom under 35 U.S.C. § 119, the content of which is incorporated herein in its entirety by reference.

BACKGROUND

1. Field

This disclosure relates to a polyimide, a composition for preparing a polyimide, an article including a polyimide, and to a display device including the article.

2. Description of the Related Art

A flexible display, which is not restricted by time and place, that is thin and flexible like paper, ultra-light, and consumes a small amount of electricity, has been increasingly in demand as a display for visualizing various information and delivering it to the users. The flexible display may be realized by using a flexible substrate, organic and inorganic materials for a low temperature process, flexible electronics, encapsulation, packaging, and the like.

A transparent plastic film for replacing a conventional window cover glass to be used in a flexible display must have high toughness and excellent optical properties. Desired optical properties include high light transmittance, low haze, low yellowness index, low YI difference after exposure to UV light, and the like.

There still remains a need for polymers having excellent optical and mechanical properties that could be used in transparent plastic films.

SUMMARY

An embodiment provides a polyimide having improved optical and mechanical properties.

Another embodiment provides a composition for preparing a polyimide.

Still another embodiment provides an article including a polyimide.

Yet another embodiment provides a display device including an article including the polyimide.

According to an embodiment, provided is a polyimide that is a reaction product of a diamine represented by Chemical Formula 1, a diamine represented by Chemical Formula 2, and a tetracarboxylic dianhydride represented by Chemical Formula 3:

Chemical Formula 1

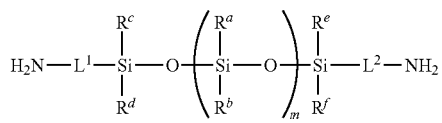

wherein in Chemical Formula 1,
$R^a$ to $R^f$ are each independently a C1 to C30 alkyl group, a C2 to C30 alkenyl group, a C2 to C30 alkynyl group, a C1 to C30 alkoxy group, a C3 to C30 cycloalkyl group, or a combination thereof,
$L^1$ and $L^2$ are each independently single bond, a C1 to C30 alkylene group, a C2 to C30 alkenylene group, a C3 to C30 cycloalkylene group, or a combination thereof, and
m is an integer ranging from 3 to 135;

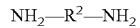

Chemical Formula 2 wherein in Chemical Formula 2,
$R^2$ includes a substituted or unsubstituted C6 to C30 aromatic organic group, wherein the substituted or unsubstituted C6 to C30 aromatic organic group includes one substituted or unsubstituted aromatic ring, two or more substituted or unsubstituted aromatic rings fused together to provide a condensed ring system, or two or more substituted or unsubstituted aromatic moieties independently selected from the foregoing linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O) NH—, a substituted or unsubstituted C3 to C10 cycloalkylene group, a substituted or unsubstituted C6 to C15 arylene group, and a combination thereof, Chemical Formula 3

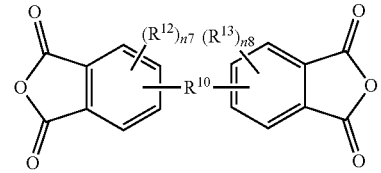

wherein, in Chemical Formula 3,
$R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein 1≤n≤10, 1≤p≤10, and 1≤q≤10,
$R^{12}$ and $R^{13}$ are each independently a halogen, a hydroxy group, a substituted or unsubstituted C1 to C10 aliphatic organic group, a C6 to C20 aromatic organic group, an alkoxy group of formula —OR$^{201}$, wherein R$^{201}$ is a C1 to C10 aliphatic organic group, or a silyl group of formula —SiR$^{210}$R$^{211}$R$^{212}$, wherein R$^{210}$, R$^{211}$, and R$^{212}$ are each independently hydrogen or a C1 to C10 aliphatic organic group,
n7 and n8 are each independently an integer ranging from 0 to 3.

In Chemical Formula 1, $L^1$ and $L^2$ may be each independently a C1 to C30 alkylene group, and $R^a$ to $R^f$ may be each independently a C1 to C30 alkyl group.

In Chemical Formula 1, both $L^1$ and $L^2$ may be propylene groups, and all of $R^a$ to $R^f$ may be methyl groups.

The diamine represented by Chemical Formula 2 may include at least one selected from the diamines represented by the following chemical formulae:

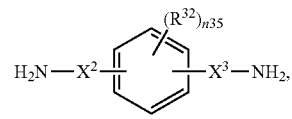

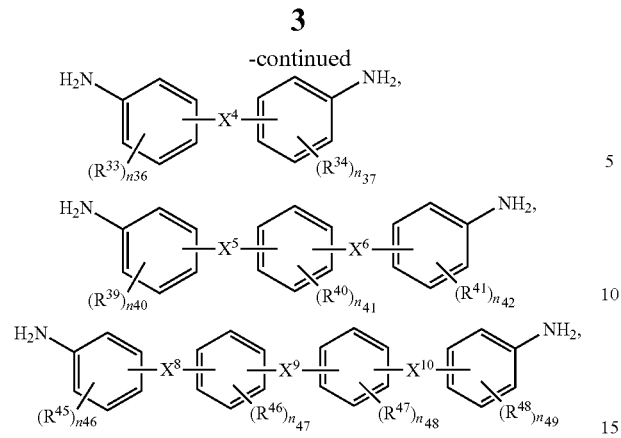

wherein in the above chemical formulae, $R^{32}$ to $R^{34}$, $R^{39}$ to $R^{41}$, and $R^{45}$ to $R^{48}$ are each independently a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 oxycycloalkyl group, a substituted or unsubstituted C6 to C15 aryl group, a substituted or unsubstituted C6 to C15 oxyaryl group, or a substituted or unsubstituted C2 to C15 heteroaryl group, $X^2$ to $X^6$, and $X^8$ to $X^{10}$ are each independently single bond, fluorenylene group, a substituted or unsubstituted C1 to C10 alkylene group, a substituted or unsubstituted C1 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— wherein $1 \le p \le 10$, —(CF$_2$)$_q$— wherein $1 \le q \le 10$, —C(CH$_3$)$_2$—, —C(CF$_3$)$_2$—, —C(=O)NH—, or a combination thereof, n35 to n37, n40 to n42, and n46 to n49 are each independently an integer ranging from 0 to 4.

The diamine represented by Chemical Formula 2 may include at least one selected from the diamines represented by the following chemical formulae:

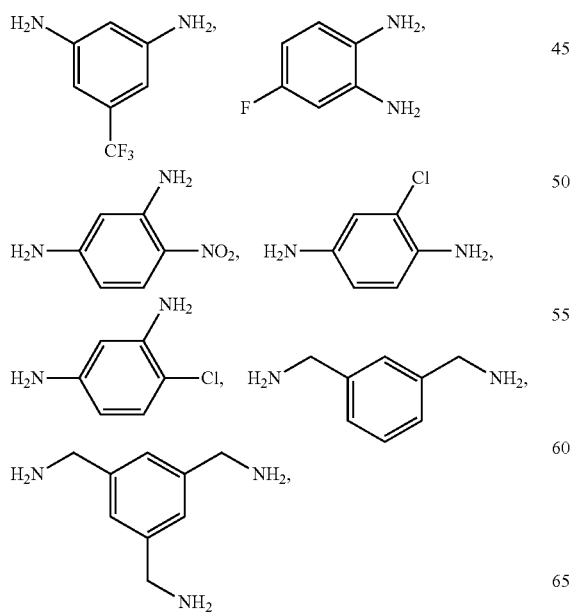

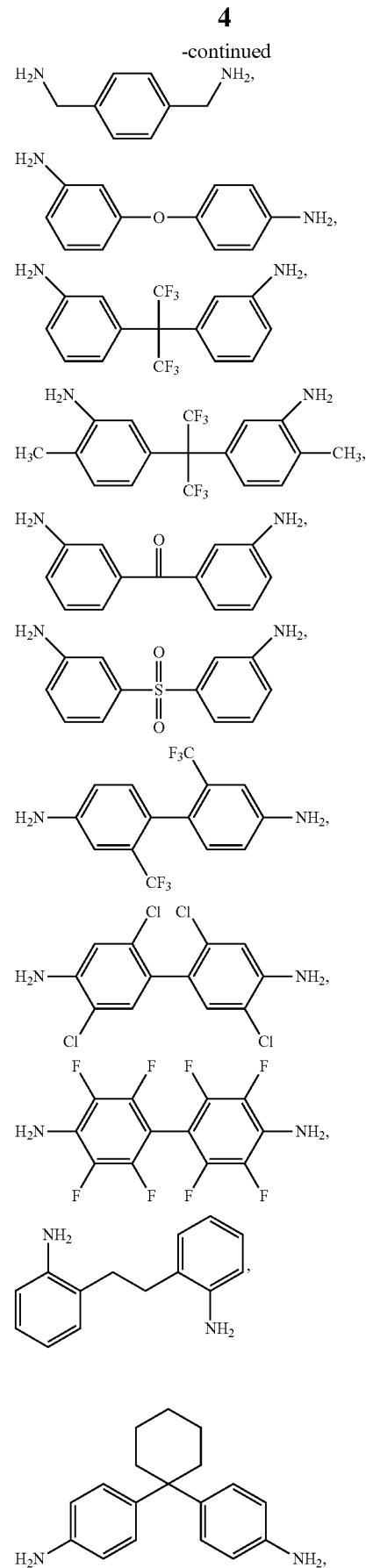

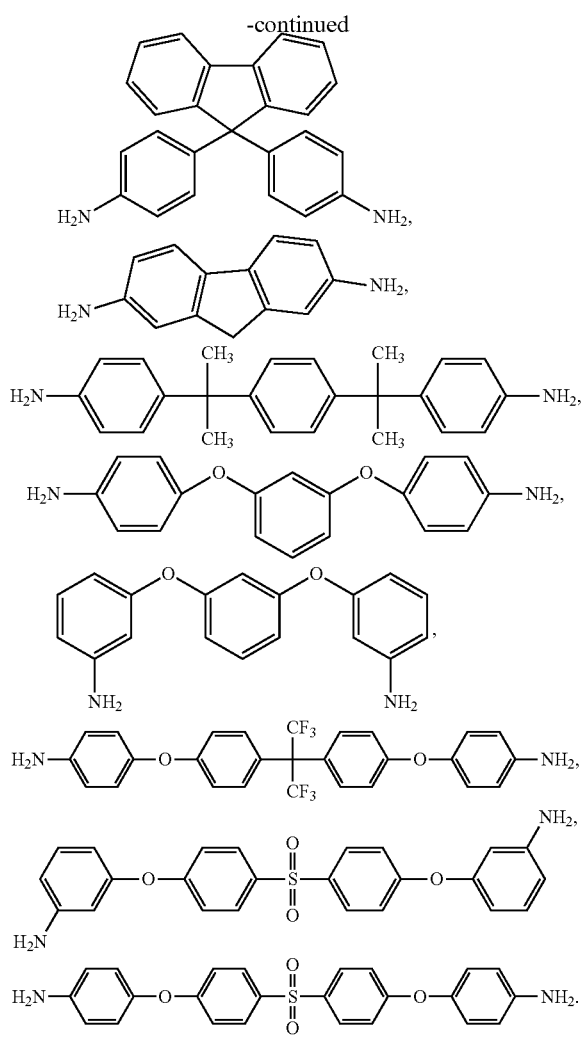

The diamine represented by Chemical Formula 2 may include a diamine represented by Chemical Formula A:

Chemical Formula A

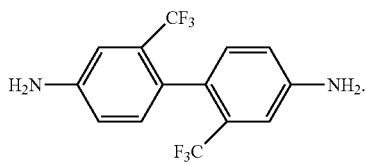

The tetracarboxylic dianhydride represented by Chemical Formula 3 may include at least one selected from 3,3',4,4'-biphenyl tetracarboxylic dianhydride, 3,3',4,4'-diphenylsulfone tetracarboxylic dianhydride, 4,4'-(hexafluoroisopropylidene)diphthalic anhydride, and 4,4'-oxydiphthalic anhydride.

The tetracarboxylic dianhydride represented by Chemical Formula 3 may be a combination of the compound represented by Chemical Formula 3 wherein $R^{10}$ is single bond, and both n7 and n8 are 0, and the compound represented by Chemical Formula 3 wherein $R^{10}$ is $-C(C_nF_{2n+1})_2-$ wherein $1 \leq n \leq 10$, and both n7 and n8 are 0.

The polyimide according to an embodiment may be a reaction product of a reactant that further includes a dicarbonyl compound represented by Chemical Formula 4:

Chemical Formula 4

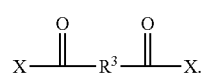

In Chemical Formula 4, $R^3$ may be a substituted or unsubstituted phenylene and/or a substituted or unsubstituted biphenylene group, and each X may be the same or different and be a halogen atom.

In Chemical Formula 4, $R^3$ may be a phenylene, and each X may be independently Cl or Br.

An amount of the diamine represented by Chemical Formula 1 may be less than 25 mole percent (mol %) based on the total amount of the diamine represented by Chemical Formula 1 and the diamine represented by Chemical Formula 2.

An amount of the dicarbonyl compound represented by Chemical Formula 4 may be less than or equal to about 50 mole percent based on the total mole number of the tetracarboxylic dianhydride represented by Chemical Formula 3 and the dicarbonyl compound represented by Chemical Formula 4.

According to an embodiment, provided is a composition for preparing a polyimide including a diamine represented by Chemical Formula 5, a diamine represented by Chemical Formula 1, and a tetracarboxylic dianhydride represented by Chemical Formula 3:

Chemical Formula 5

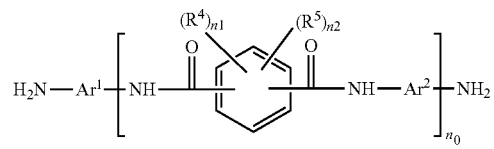

wherein, in Chemical Formula 5,
$R^4$ and $R^5$ are each independently a halogen, a hydroxy group, a substituted or unsubstituted C1 to C10 alkyl group, or a substituted or unsubstituted C1 to C10 alkoxy group,
n0 is an integer greater than or equal to 0,
n1 and n2 are each independently an integer ranging from 0 to 4, provided that n1+n2 is an integer ranging from 0 to 4, and
$Ar^1$ and $Ar^2$ are each independently represented by Chemical Formula 6:

Chemical Formula 6

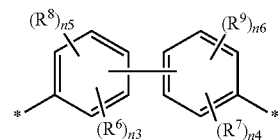

wherein, in Chemical Formula 6,
$R^6$ and $R^7$ are each independently an electron withdrawing group selected from $-CF_3$, $-CCl_3$, $-CBr_3$, $-Cl_3$, $-NO_2$, $-CN$, $-C(=O)CH_3$, and $-CO_2C_2H_5$, $R^8$ and $R^9$ are each independently a halogen, a hydroxy group, a substituted or unsubstituted C1 to C10 aliphatic organic group, a C6 to C20 aromatic organic group, an alkoxy group of formula —$OR^{204}$, wherein $R^{204}$ is a C1 to C10 aliphatic organic group, or a silyl group of formula —$SiR^{205}R^{206}R^{207}$ wherein $R^{205}$, $R^{206}$, and $R^{207}$ are each independently hydrogen or a C1 to C10 aliphatic organic group, n3 is an integer ranging from 1 to 4, n5 is an integer ranging from 0 to 3, provided that n3+n5 is an integer ranging from 1 to 4, and n4 is an integer ranging from 1 to 4, n6 is an integer ranging from 0 to 3, provided that n4+n6 is an integer ranging from 1 to 4;

Chemical Formula 1

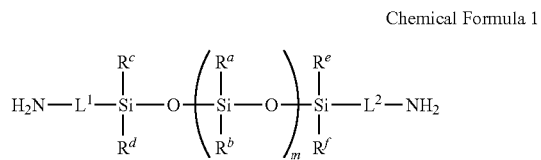

wherein in Chemical Formula 1, $R^a$ to $R^f$ are each independently a C1 to C30 alkyl group, a C2 to C30 alkenyl group, a C2 to C30 alkynyl group, a C1 to C30 alkoxy group, a C3 to C30 cycloalkyl group, or a combination thereof, $L^1$ and $L^2$ are each independently single bond, a C1 to C30 alkylene group, a C2 to C30 alkenylene group, a C3 to C30 cycloalkylene group, or a combination thereof, and m is an integer ranging from 3 to 135;

Chemical Formula 3

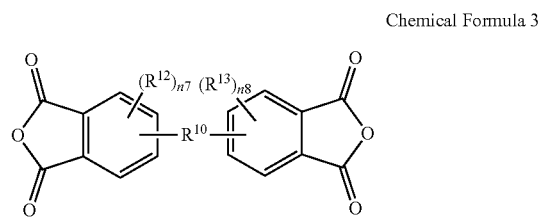

wherein, in Chemical Formula 3, $R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein 1≤n≤10, 1≤p≤10, and 1≤q≤10, $R^{12}$ and $R^{13}$ are each independently a halogen, a hydroxy group, a substituted or unsubstituted C1 to C10 aliphatic organic group, a substituted or unsubstituted C6 to C20 aromatic organic group, an alkoxy group of formula —$OR^{201}$, wherein $R^{201}$ is a C1 to C10 aliphatic organic group, or a silyl group of formula —$SiR^{210}R^{211}R^{212}$, wherein $R^{210}$, $R^{211}$, and $R^{212}$ are each independently hydrogen or a C1 to C10 aliphatic organic group, and n7 and n8 are each independently an integer ranging from 0 to 3.

The composition may further include a diamine represented by Chemical Formula 2:

$NH_2$—$R^2$—$NH_2$  Chemical Formula 2 wherein in Chemical Formula 2, $R^2$ includes a substituted or unsubstituted C6 to C30 aromatic organic group, wherein the substituted or unsubstituted C6 to C30 aromatic organic group includes one substituted or unsubstituted aromatic ring, two or more substituted or unsubstituted aromatic rings fused together to provide a condensed ring system, or two or more substituted or unsubstituted aromatic moieties independently selected from the foregoing linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O)NH—, a substituted or unsubstituted C3 to C10 cycloalkylene group, a substituted or unsubstituted C6 to C15 arylene group, and a combination thereof.

In Chemical Formula 1, both $L^1$ and $L^2$ may be a C1 to C30 alkylene group, and $R^a$ to $R^f$ are each independently a C1 to C30 alkyl group.

The tetracarboxylic dianhydride represented by Chemical Formula 3 may be a combination of the compound represented by Chemical Formula 3 wherein $R^{10}$ is single bond, and both n7 and n8 are 0, and the compound represented by Chemical Formula 3 wherein $R^{10}$ is —C(C$_n$F$_{2n+1}$)$_2$— wherein 1≤n≤10, and both n7 and n8 are 0.

Both n1 and n2 in Chemical Formula 5 may be 0 (zero), and in Chemical Formula 6, both $R^6$ and $R^7$ may be —CF$_3$, both n3 and n4 may be 1, and both n5 and n6 may be 0 (zero).

According to another embodiment, provided is an article including a polyimide according to an embodiment.

The article may be a film, wherein the film may have a toughness of greater than or equal to 2,000 Joules×reverse cubic meters×$10^4$ (Joul·m$^{-3}$·$10^4$), and a refractive index of less than 1.64, when the film has a thickness of about 35 micrometers to about 100 micrometers.

According to another embodiment, provided is a display device including an article according to an embodiment.

Hereinafter, further embodiments will be described in detail.

DETAILED DESCRIPTION

This disclosure will be described more fully hereinafter with reference to exemplary embodiments. This disclosure may, however, be embodied in many different forms and is not to be construed as limited to the exemplary embodiments set forth herein.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) as used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

"Mixture" as used herein is inclusive of all types of combinations, including blends, alloys, solutions, and the like.

As used herein, when a specific definition is not otherwise provided, the term "substituted" refers to a group or compound substituted with at least one substituent including a halogen (—F, —Br, —Cl, or —I), a hydroxy group, a nitro group, a cyano group, an amino group (—NH$_2$, —NH(R$^{100}$) or —N(R$^{101}$)(R$^{102}$), wherein R$^{100}$, R$^{101}$, and R$^{102}$ are the same or different, and are each independently a C1 to C10 alkyl group), an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, or the substituents may be linked to each other to provide a ring.

As used herein, the term "alkyl group" refers to a straight or branched chain saturated aliphatic hydrocarbon group having the specified number of carbon atoms and having a valence of at least one. Non-limiting examples of the alkyl group are methyl, ethyl, and propyl.

As used herein, the term "alkoxy group" refers to "alkyl-O—", wherein the term "alkyl" has the same meaning as described above. Non-limiting examples of the alkoxy group are methoxy, ethoxy, and propoxy.

As used herein, the term "aryl group", which is used alone or in combination, refers to an aromatic hydrocarbon group containing at least one ring. Non-limiting examples of the aryl group are phenyl, naphthyl, and tetrahydronaphthyl.

As used herein, when a specific definition is not otherwise provided, the term "alkyl group" refers to a C1 to C30 alkyl group, for example, a C1 to C15 alkyl group, the term "cycloalkyl group" refers to a C3 to C30 cycloalkyl group, for example, a C3 to C18 cycloalkyl group, the term "alkoxy group" refer to a C1 to C30 alkoxy group, for example, a C1 to C18 alkoxy group, the term "ester group" refers to a C2 to C30 ester group, for example, a C2 to C18 ester group, the term "ketone group" refers to a C2 to C30 ketone group, for example, a C2 to C18 ketone group, the term "aryl group" refers to a C6 to C30 aryl group, for example, a C6 to C18 aryl group, the term "alkenyl group" refers to a C2 to C30 alkenyl group, for example, a C2 to C18 alkenyl group, the term "alkynyl group" refers to a C2 to C30 alkynyl group, for example, a C2 to C18 alkynyl group, the term "alkylene group" refers to a C1 to C30 alkylene group, for example, a C1 to C18 alkylene group, and the term "arylene group" refers to a C6 to C30 arylene group, for example, a C6 to C16 arylene group.

As used herein, when a specific definition is not otherwise provided, the term "aliphatic organic group" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, for example, a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, for example, a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group.

As used herein when a definition is not otherwise provided, the term "aromatic organic group" refers to a C6 to C30 group including one aromatic ring, two or more aromatic rings fused together to provide a condensed ring system, or two or more moieties independently selected from the foregoing (a single aromatic ring or a condensed ring system) linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$—, wherein 1≤q≤10, —(CF$_2$)$_q$—, wherein 1≤q≤10, —C(CH$_3$)$_2$—, —C(CF$_3$)$_2$—, and —C(=O)NH—, for example, through —S(=O)$_2$—, for example a C6 to C30 aryl group or a C6 to C30 arylene group, for example, a C6 to C16 aryl group or a C6 to C16 arylene group such as phenylene. An example of an aromatic organic group is a fluorenylene group.

As used herein, when a specific definition is not otherwise provided, the term "heterocyclic group" refers to a C2 to C30 heterocycloalkyl group, a C2 to C30 heterocycloalkylene group, a C2 to C30 heterocycloalkenyl group, a C2 to C30 heterocycloalkenylene group, a C2 to C30 heterocycloalkynyl group, a C2 to C30 heterocycloalkynylene group, a C2 to C30 heteroaryl group, or a C2 to C30 heteroarylene group including 1 to 3 heteroatoms selected from O, S, N, P, Si, and a combination thereof in one ring, for example, a C2 to C15 heterocycloalkyl group, a C2 to C15 heterocycloalkylene group, a C2 to C15 heterocycloalkenyl group, a C2 to C15 heterocycloalkenylene group, a C2 to C15 heterocycloalkynyl group, a C2 to C15 heterocycloalkynylene group, a C2 to C15 heteroaryl group, or a C2 to C15 heteroarylene group including 1 to 3 heteroatoms selected from O, S, N, P, Si, and a combination thereof, in one ring.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted C1 to C30 alkyl" refers to a C1 to C30 alkyl group substituted with C6 to C30 aryl group, the total number of carbon atoms in the resulting aryl substituted alkyl group is C7 to C60.

As used herein, when a definition is not otherwise provided, "combination" commonly refers to mixing or copolymerization.

As used herein, when a definition is not otherwise provided, "polyimide" may refer to not only "polyimide", but also "polyamic acid" or a combination of "polyimide" and "polyamic acid". Further, the terms "polyimide" and "polyamic acid" may be understood as the same material.

In addition, in the specification, the mark "*" may refer to a point of attachment to another atom.

Research efforts towards converting mobile devices, such as, a mobile phone or a tablet personal computer, and the like, to light, flexible, and bendable devices are currently ongoing. In this regard, a flexible and transparent window film for a display device having high hardness for replacing a rigid glass placed on top of the mobile devices is desired.

To be used as a window film, good optical and mechanical properties are desired. The desired optical properties include high light transmittance, low yellowness index (YI), low YI difference after exposure to UV light, low haze, low refractive index (low reflection index), and the like. Mechanical properties, such as hardness, may be supplemented with a hard coating layer, but a base film having high toughness may ensure that a final film has high mechanical properties.

A polyimide or poly(amide-imide) copolymer has excellent mechanical, thermal, and optical properties, and thus, is widely used as a plastic substrate for a display device, such as an organic light emitting diode (OLED), liquid crystal display (LCD), and the like. In order to use polyimide or poly(amide-imide) film as a window film for a flexible display device, however, further improved mechanical and optical properties, such as, high hardness (or modulus), toughness, high light transmittance, low yellowness index, low refractive index, and the like, are desired. It is difficult, however, to improve both mechanical and optical properties of the film at the same time, as the two properties, especially, tensile modulus and yellowness index of a polyimide or poly(amide-imide) film are in a trade-off relationship with regard to each other.

Meanwhile, in an effort to improve mechanical properties of a polyimide or a poly(amide-imide) copolymer film, researches prepared a polyimide or a poly(amide-imide) copolymer by introducing an amide structural unit, increasing the amount of an amide structural unit, or including a dianhydride having a more rigid structure. In this case, however, tensile modulus is hardly improved, while optical properties, such as YI, are deteriorated. Otherwise, refractive index of a film may increase to increase reflection index, or toughness may reduce.

The inventors of the subject matter of the present application have developed a polyimide or a poly(amide-imide) copolymer having good optical properties, such as, for example, low refractive index, as well as improved toughness, and a composition for preparing the polyimide or poly(amide-imide). As a result, they have found a new polyimide prepared by reacting an aromatic tetracarboxylic dianhydride, and an aromatic diamine, along with a diamine including a siloxane skeleton and aliphatic organic groups attached to the silicon atoms of the siloxane skeleton has relatively low refractive index, relatively high toughness, as well as excellent optical properties. For example, when the prepared poly(amide-imide) copolymer is fabricated into a film having a thickness of about 50 micrometers (μm), the film may have a toughness of greater than or equal to 2,000 Joules×reverse cubic meters×10$^4$ (Joul·m$^{-3}$·10$^4$), a light transmittance of greater than or equal to 89% in a wavelength range of 350 nanometers (nm) to 750 nm, a yellowness index of less than or equal to 2.2, and a refractive index of less than 1.64.

Accordingly, an embodiment provides a polyimide that is a reaction product of a diamine represented by Chemical Formula 1, a diamine represented by Chemical Formula 2, and a tetracarboxylic dianhydride represented by Chemical Formula 3:

Chemical Formula 1

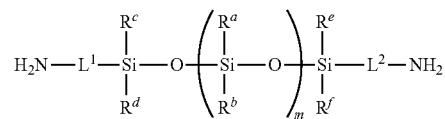

wherein in Chemical Formula 1,
$R^a$ to $R^f$ are each independently a C1 to C30 alkyl group, a C2 to C30 alkenyl group, a C2 to C30 alkynyl group, a C1 to C30 alkoxy group, a C3 to C30 cycloalkyl group, or a combination thereof,
$L^1$ and $L^2$ are each independently a single bond, a C1 to C30 alkylene group, a C2 to C30 alkenylene group, a C3 to C30 cycloalkylene group, or a combination thereof, and
m is an integer ranging from 3 to 135;

$NH_2$—$R^2$—$NH_2$            Chemical Formula 2 wherein in Chemical Formula 2,
$R^2$ includes a substituted or unsubstituted C6 to C30 aromatic organic group, wherein the substituted or unsubstituted C6 to C30 aromatic organic group includes one substituted or unsubstituted aromatic ring, two or more substituted or unsubstituted aromatic rings fused together to provide a condensed ring system, or two or more substituted or unsubstituted aromatic moieties independently selected from the foregoing linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O)NH—, a substituted or unsubstituted C3 to C10 cycloalkylene group, a substituted or unsubstituted C6 to C15 arylene group, and a combination thereof;

Chemical Formula 3

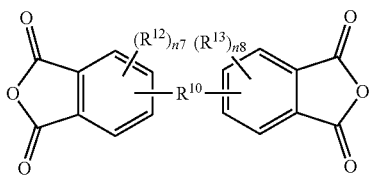

wherein, in Chemical Formula 3, $R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein 1≤n≤10, 1≤p≤10, and 1≤q≤10, $R^{12}$ and $R^{13}$ are each independently a halogen, a hydroxy group, a substituted or unsubstituted C1 to C10 aliphatic organic group, a C6 to C20 aromatic organic group, an alkoxy group of formula —OR$^{201}$, wherein R$^{201}$ is a C1 to C10 aliphatic organic group, or a silyl group of formula —SiR$^{210}$R$^{211}$R$^{212}$, wherein R$^{210}$, R$^{211}$, and R$^{212}$ are each independently hydrogen or a C1 to C10 aliphatic organic group, and n7 and n8 are each independently an integer ranging from 0 to 3.

In Chemical Formula 1, $L^1$ and $L^2$ may be independently a C1 to C30 alkylene group, for example, a C1 to C20 alkylene group, for example, a C1 to C10 alkylene group, for example, a C1 to C5 alkylene group.

In an exemplary embodiment, $L^1$ and $L^2$ may be independently methylene group, ethylene group, propylene group, butylene group, or pentylene group, and for example, both $L^1$ and $L^2$ may be a propylene group.

In Chemical Formula 1, $R^a$ to $R^f$ may be each independently a C1 to C30 alkyl group, for example, a C1 to C20 alkyl group, for example, a C1 to C10 alkyl group.

In an exemplary embodiment, $R^a$ to $R^f$ may be each independently methyl group, ethyl group, propyl group, butyl group, or pentyl group, and for example, may be each independently a methyl group, ethyl group, or a propyl group.

In an exemplary embodiment, in Chemical Formula 1, both $L^1$ and $L^2$ may be a propylene group, and all of $R^a$ to $R^f$ may be methyl group.

In an exemplary embodiment, m in Chemical Formula 1 may be an integer ranging from 3 to 135, for example, an integer ranging from 3 to 120, for example, an integer ranging from 3 to 110, for example, an integer ranging from 3 to 100, for example, an integer ranging from 3 to 90, for example, an integer ranging from 3 to 80, for example, an integer ranging from 3 to 70, for example, an integer ranging from 3 to 60, for example, an integer ranging from 3 to 50, for example, an integer ranging from 3 to 40, for example, an integer ranging from 3 to 30, for example, an integer ranging from 3 to 25, for example, an integer ranging from 3 to 20, for example, an integer ranging from 3 to 15, for example, an integer ranging from 3 to 12, for example, an integer ranging from 3 to 10, for example, an integer ranging from 3 to 8, for example, an integer ranging from 3 to 7, and for example, an integer ranging from 3 to 5. By adjusting 'm' in the above range, the amount of the siloxane unit in the diamine represented by Chemical Formula 1, and the molecular weight of the compound may be easily controlled. Although the diamine represented by Chemical Formula 1 may be included in an identical amount, as the number of the siloxane unit in the compound increases, the refractive index of the polyimide prepared therefrom may reduce.

In an exemplary embodiment, the diamine represented by Chemical Formula 1 may have a number average molecular weight, determined by a Gel Permeation Chromatography (GPC), of about 500 to 10,000 gram/mole, for example, about 500 to 9,000 gram/mole, for example, about 500 to 8,000 gram/mole, for example, about 500 to 7,000 gram/mole, for example, about 500 to 6,000 gram/mole, for example, about 500 to 5,000 gram/mole, for example, about 500 to 4,000 gram/mole, for example, about 500 to 3,500 gram/mole, for example, about 500 to 3,000 gram/mole, for example, about 500 to 2,500 gram/mole, for example, about 500 to 2,000 gram/mole, for example, about 500 to 1,500 gram/mole, for example, about 500 to 1,300 gram/mole, for example, about 500 to 1,200 gram/mole, for example, about 500 to 1,000 gram/mole, for example, about 600 to 1,000 gram/mole, for example, about 700 to 1,000 gram/mole, and for example, about 800 to 1,000 gram/mole.

When the diamine represented by Chemical Formula 1 has a number average molecular weight in the above range, the polyimide prepared from a reaction mixture including the diamine in an amount of less than 25 mol %, for examples, less than or equal to 20 mol %, for examples, less than or equal to 15 mol %, for examples, less than or equal to 10 mol %, for examples, less than or equal to 5 mol %, and the like, may have a relatively law refractive index, as well as a high toughness.

In an exemplary embodiment, an amount of the diamine represented by Chemical Formula 1 may range from 1 mol % to 20 mol %, for example, from 2 mol % to 20 mol %, for example, from 2 mol % to 18 mol %, for example, from 3 mol % to 15 mol %, for example, from 5 mol % to 15 mol %, or for example, from 5 mol % to 10 mol %, based on the total amount of the diamine represented by Chemical Formula 1 and the diamine represented by Chemical Formula 2. While not wishing to be bound by theory, it is understood that when the polyimide prepared from a reaction mixture including the diamine represented by Chemical Formula 1 in an amount of the above range may have improved optical properties as having a lower refractive index than the polyimide that does not include the diamine, as well as improved mechanical properties as having an improved toughness. In this way, a polyimide prepared by including the diamine represented by Chemical Formula 1 may have improved optical and mechanical properties.

When an amount of the diamine represented by Chemical Formula 1 is greater than or equal to 25 mol %, based on the total amount of the diamine represented by Chemical Formula 1 and the diamine represented by Chemical Formula 2, although the refractive index of the polyimide may further reduce, mechanical properties, such as, for example, a toughness, may be deteriorated.

The diamine represented by Chemical Formula 2 may include at least one selected from the diamines represented by the following chemical formulae:

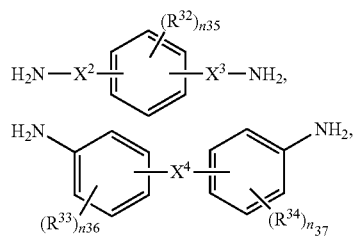

-continued

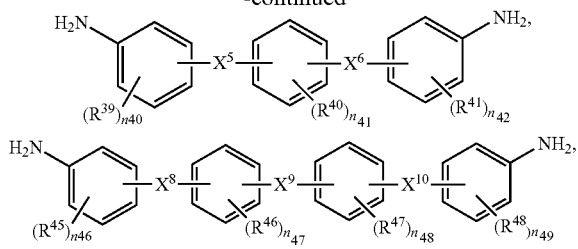

wherein in the above chemical formulae,
$R^{32}$ to $R^{34}$, $R^{39}$ to $R^{41}$, and $R^{45}$ to $R^{48}$ are each independently a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 oxycycloalkyl group, a substituted or unsubstituted C6 to C15 aryl group, a substituted or unsubstituted C6 to C15 oxyaryl group, or a substituted or unsubstituted C2 to C15 heteroaryl group, $X^2$ to $X^6$, and $X^8$ to $X^{10}$ are each independently single bond, fluorenylene group, a substituted or unsubstituted C1 to C10 alkylene group, a substituted or unsubstituted C1 to C10 cycloalkylene group, a substituted or unsubstituted C6 to C15 arylene group, —O—, —S—, —C(═O)—, —CH(OH)—, —S(═O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(═O)NH—, or a combination thereof, and n35 to n37, n40 to n42, and n46 to n49 are each independently an integer ranging from 0 to 4.

The diamine represented by Chemical Formula 2 may include at least one selected from the diamines represented by the following chemical formulae:

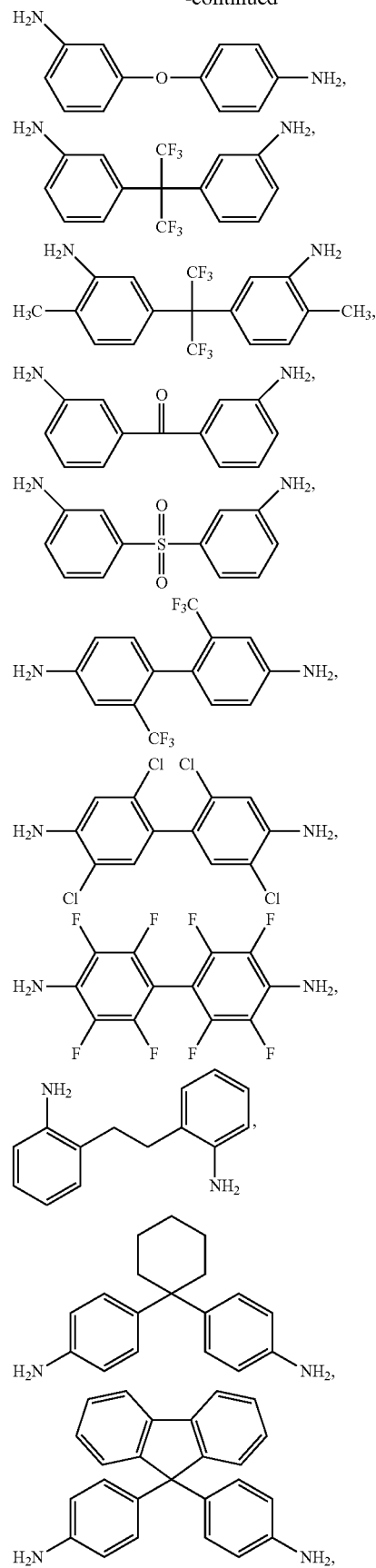

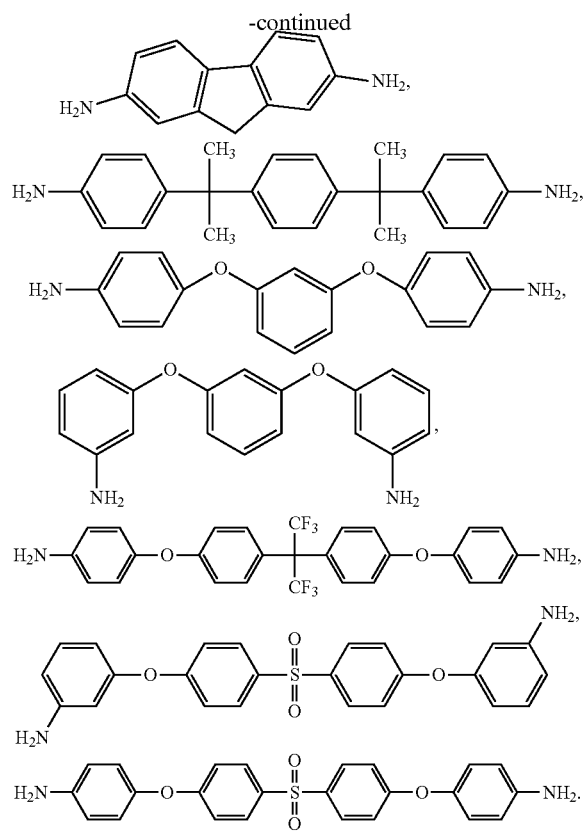

The diamine represented by Chemical Formula 2 may include a diamine represented by Chemical Formula A, i.e., 2,2'-bis(trifluoromethyl)benzidine (TFDB):

Chemical Formula A

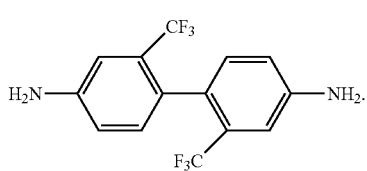

The tetracarboxylic dianhydride represented by Chemical Formula 3 may include at least one selected from 3,3',4,4'-biphenyl tetracarboxylic dianhydride (BPDA), 3,3',4,4'-diphenylsulfone tetracarboxylic dianhydride (DSDA), 4,4'-(hexafluoroisopropylidene)diphthalic anhydride (6FDA), and 4,4'-oxydiphthalic anhydride (ODPA), and is not limited thereto.

In an exemplary embodiment, the tetracarboxylic dianhydride represented by Chemical Formula 3 may be a combination of the compound represented by Chemical Formula 3 wherein $R^{10}$ is a single bond, and both n7 and n8 are 0, that is, 3,3',4,4'-biphenyl tetracarboxylic dianhydride (BPDA), and the compound represented by Chemical Formula 3 wherein $R^{10}$ is —C($C_nF_{2n+1}$)$_2$— wherein 1≤n≤10, and both n7 and n8 are 0, that is, 4,4'-(hexafluoroisopropylidene)diphthalic anhydride (6FDA).

In an exemplary embodiment, the polyimide may be prepared by further including a dicarbonyl compound represented by Chemical Formula 4:

Chemical Formula 4

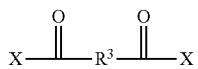

wherein, in Chemical Formula 4, $R^3$ may be a substituted or unsubstituted phenylene and/or a substituted or unsubstituted biphenylene group, and each X may be an identical or a different halogen atom.

When preparing a polyimide according to an embodiment by further including the compound represented by Chemical Formula 4, the prepared polyimide may further include an amide structural unit derived from the compound represented by Chemical Formula 4. That is, the polyimide may include an imide structural unit derived from a reaction of a diamine and a tetracarboxylic dianhydride, as well as an amide structural unit derived from a reaction of a diamine and a dicarbonyl compound. As such, a polyimide including an imide structural unit, as well as an amide structural unit, may have further improved mechanical properties, such as, for example, an increased tensile modulus. However, if an amount of the amide structural unit further increases exceeding a predetermined range, while mechanical properties, such as, for example, a tensile modulus, may be improved, optical properties, such as, for example, a yellowness index (YI) may be deteriorated due to the increased amount of the amide structural unit. Accordingly, in an exemplary embodiment, the dicarbonyl compound represented by Chemical Formula 4 may be included in an amount of less than or equal to about 50 mole percent, for example, less than or equal to about 45 mole percent, for example, less than or equal to about 40 mole percent, for example, less than or equal to about 35 mole percent, or for example, less than or equal to about 30 mole percent, based on the total mole number of the tetracarboxylic dianhydride represented by Chemical Formula 3 and the dicarbonyl compound represented by Chemical Formula 4.

In an exemplary embodiment, $R^3$ of Chemical Formula 4 may be a phenylene group, and each X may be independently Cl or Br.

In an exemplary embodiment, the dicarbonyl compound represented by Chemical Formula 4 may be terephthaloic dichloride (TPCl).

As described above, at least one of the diamines represented by Chemical Formula 1 and Chemical Formula 2 may react with a dicarbonyl compound represented by Chemical Formula 4 to form an amide structural unit, and at least one of the diamines represented by Chemical Formula 1 and Chemical Formula 2 may react with a tetracarboxylic dianhydride to form an imide structural unit.

A conventional method for preparing a polyimide, for example, a polyimide further including an amide structural unit, i.e., a poly(amide-imide) copolymer, may include preparing an amide structural unit by reacting a dicarbonyl compound represented by Chemical Formula 4, such as, for example, a dicarbonyl chloride, with at least one diamine represented by Chemical Formula 1 or Chemical Formula 2, and further adding and reacting an additional diamine, such as, for example, a diamine represented by Chemical Formula 1 or Chemical Formula 2 with a tetracarboxylic dianhydride, for example, a tetracarboxylic dianhydride represented by Chemical Formula 3 to prepare an amic acid structural unit with the diamine and the tetracarboxylic dianhydride, as well as to link the prepared amide structural unit and the amic acid structural unit to provide a poly(amide-amic acid) copolymer. Thus prepared poly(amide-amic acid) copolymer may be partially or completely imidized by chemical and/or thermal imidization reaction. Then, the obtained poly(amide-amic acid and/or imide) copolymer may be precipitated, filtered, and/or further heat-treated to provide a final poly(amide-imide) copolymer. This method is well-known to persons skilled in the art to which the invention pertains.

An amide structural unit prepared by reacting a diamine represented by Chemical Formula 1 and a dicarbonyl compound represented by Chemical Formula 4 may be represented by Chemical Formula 7, and an amide structural unit prepared by reacting a diamine represented by Chemical Formula 2 and a dicarbonyl compound represented by Chemical Formula 4 may be represented by Chemical Formula 8:

Chemical Formula 7

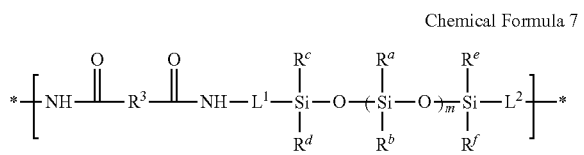

wherein in Chemical Formula 7,
$R^3$ is the same as defined for Chemical Formula 4, and $R^a$ to $R^f$, $L^1$ and $L^2$, and m are the same as defined for Chemical Formula 1, Chemical Formula 8

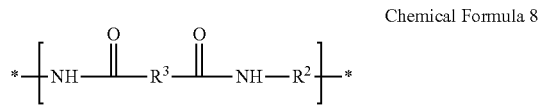

wherein in Chemical Formula 8,
$R^3$ is the same as defined for Chemical Formula 4, and $R^2$ is the same as defined for Chemical Formula 2.

Meanwhile, an imide structural unit prepared by reacting a diamine represented by Chemical Formula 1 and a tetracarboxylic dianhydride represented by Chemical Formula 3 may be represented by Chemical Formula 9, and an imide structural unit prepared by reacting a diamine represented by Chemical Formula 2 and a tetracarboxylic dianhydride represented by Chemical Formula 3 may be represented by Chemical Formula 10:

Chemical Formula 9

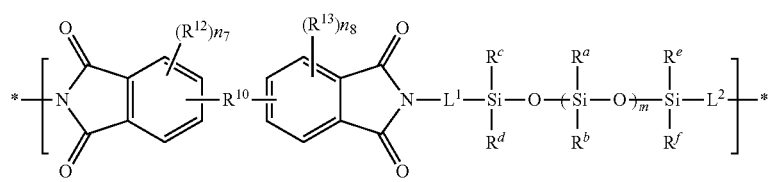

wherein in Chemical Formula 9,
$R^a$ to $R^f$, $L^1$ and $L^2$, and m are the same as defined for Chemical Formula 1, and $R^{10}$, $R^{12}$, $R^{13}$, n7 and n8 are independently the same as defined for Chemical Formula 3:

Chemical Formula 10

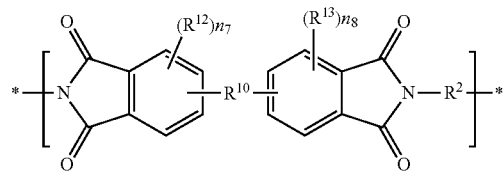

wherein in Chemical Formula 10,
$R^2$ is the same as defined for Chemical Formula 2, and $R^{10}$, $R^{12}$, $R^{13}$, n7 and n8 are independently the same as defined for Chemical Formula 3.

Therefore, a polyimide according to an embodiment may include imide structural units represented by Chemical Formula 9 and Chemical Formula 10, or optionally, in addition to the imide structural units, further include an amide structural unit represented by at least one of Chemical Formula 7 and Chemical Formula 8.

Meanwhile, the tetracarboxylic dianhydride represented by Chemical Formula 3 may be a combination of a compound of Chemical Formula 3 wherein $R^{10}$ is a single bond, and both n7 and n8 are zero (0), and a compound of Chemical Formula 3 wherein is $—C(C_nF_{2n+1})_2—$ where $1 \leq n \leq 10$, and both n7 and n8 are zero (0), wherein the mole ratio of the former and the latter may be 1:1 to 1:4, for example, 1:1 to 1:3, for example, 1:1.5 to 1:2.5. In an exemplary embodiment, the tetracarboxylic dianhydride represented by Chemical Formula 3 may be a combination of BPDA and 6FDA. In an exemplary embodiment, a polyimide prepared by reacting the tetracarboxylic dianhydrides including a combination of BPDA and 6FDA with the diamines represented by Chemical Formula 1 and Chemical Formula 2 in the above range of mole ratio may have excellent optical properties, such as, for example, a relatively high transmittance, a relatively low YI, and a relatively low refractive index, as well as having improved mechanical properties, such as, for example, a relatively high toughness.

When $R^{10}$ of Chemical Formula 3 is a single bond, the tetracarboxylic dianhydride may have a further rigid structure, compared with the one in which $R^{10}$ is not a single bond. Accordingly, as the amount of the tetracarboxylic dianhydride having a rigid structure increases, the polyimide prepared therefrom has been regarded as having further improved mechanical properties. However, while the polyimide according to an embodiment is prepared by including the tetracarboxylic dianhydride represented by Chemical Formula 3 where $R^{10}$ is not a single bond in a greater amount than the compound where $R^{10}$ is a single bond, it still may have excellent mechanical properties, such as, for example, a high toughness of greater than or equal to 2,000 Joul·$m^{-3} \cdot 10^4$, as well as good optical properties, such as, for example, a relatively high transmittance of about 89% or more in a wavelength range of from 350 nm to 750 nm, a relatively low YI of less than or equal to 2.2., and a relatively low refractive index of less than 1.64.

Accordingly, the polyimide according to an embodiment having excellent optical and mechanical properties may be advantageous for a use in a display device, such as, for example, as a window film for a flexible display device.

Another embodiment provides a composition for preparing a polyimide including a diamine represented by Chemical Formula 5, a diamine represented by Chemical Formula 1, and a tetracarboxylic dianhydride represented by Chemical Formula 3:

Chemical Formula 5

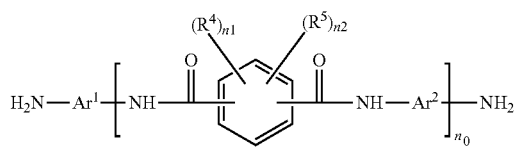

wherein, in Chemical Formula 5, $R^4$ and $R^5$ are each independently a halogen, a hydroxy group, a substituted or unsubstituted C1 to C10 alkyl group, or a substituted or unsubstituted C1 to C10 alkoxy group, n0 is an integer greater than or equal to 0, n1 and n2 are each independently an integer ranging from 0 to 4, provided that n1+n2 is an integer ranging from 0 to 4, and $Ar^1$ and $Ar^2$ are each independently represented by Chemical Formula 6:

Chemical Formula 6

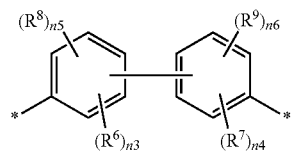

wherein, in Chemical Formula 6, $R^6$ and $R^7$ are each independently an electron withdrawing group selected from $—CF_3$, $—CCl_3$, $—CBr_3$, $—Cl_3$, $—NO_2$, —CN, —C(=O)$CH_3$, and $—CO_2C_2H_5$, $R^8$ and $R^9$ are each independently a halogen, a hydroxy group, a substituted or unsubstituted C1 to C10 aliphatic organic group, a C6 to C20 aromatic organic group, an alkoxy group of formula $—OR^{204}$, wherein $R^{204}$ is a C1 to C10 aliphatic organic group, or a silyl group of formula $—SiR^{205}R^{206}R^{207}$ wherein $R^{205}$, $R^{206}$, and $R^{207}$ are each independently hydrogen or a C1 to C10 aliphatic organic group, n3 is an integer ranging from 1 to 4, n5 is an integer ranging from 0 to 3, provided that n3+n5 is an integer ranging from 1 to 4, and n4 is an integer ranging from 1 to 4, n6 is an integer ranging from 0 to 3, provided that n4+n6 is an integer ranging from 1 to 4;

Chemical Formula 1

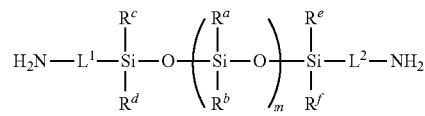

wherein in Chemical Formula 1, $R^a$ to $R^f$ are each independently a C1 to C30 alkyl group, a C2 to C30 alkenyl group, a C2 to C30 alkynyl group, a C1 to C30 alkoxy group, a C3 to C30 cycloalkyl group, or a combination thereof, $L^1$ and $L^2$ are each independently single bond, a C1 to C30 alkylene group, a C2 to C30 alkenylene group, a C3 to C30 cycloalkylene group, or a combination thereof, and m is an integer ranging from 3 to 135.

Chemical Formula 3

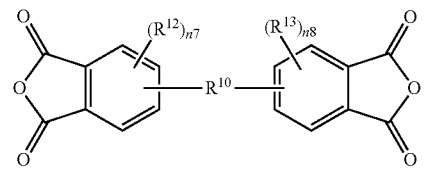

wherein, in Chemical Formula 3, $R^{10}$ is a single bond, —O—, —S—, —C(=O)—, —CH(OH)—, —C(=O)NH—, $—S(=O)_2—$, $—Si(CH_3)_2—$, $—(CH_2)_p—$, $—(CF_2)_q—$, $—C(C_nH_{2n+1})_2—$, $—C(C_nF_{2n+1})_2—$, $—(CH_2)_pC(C_nH_{2n+1})_2(CH_2)_q—$, or $—(CH_2)_pC(C_nF_{2n+1})_2(CH_2)_q—$ wherein $1 \le n \le 10$, $1 \le p \le 10$, and $1 \le q \le 10$, $R^{12}$ and $R^{13}$ are each independently a halogen, a hydroxy group, a substituted or unsubstituted C1 to C10 aliphatic organic group, a substituted or unsubstituted C6 to C20 aromatic organic group, an alkoxy group of formula $—OR^{201}$, wherein $R^{201}$ is a C1 to C10 aliphatic organic group, or a silyl group of formula $—SiR^{210}R^{211}R^{212}$, wherein $R^{210}$, $R^{211}$, and $R^{212}$ are each independently hydrogen or a C1 to C10 aliphatic organic group, and n7 and n8 are each independently an integer ranging from 0 to 3.

Both n1 and n2 in Chemical Formula 5 may be 0 (zero), and in Chemical Formula 6, both $R^6$ and $R^7$ may be $—CF_3$, both n3 and n4 may be 1, and both n5 and n6 may be 0 (zero).

The composition may further include a diamine represented by Chemical Formula 2:

$$NH_2—R^2—NH_2 \quad \text{Chemical Formula 2}$$

wherein in Chemical Formula 2, $R^2$ includes a substituted or unsubstituted C6 to C30 aromatic organic group, wherein the substituted or unsubstituted C6 to C30 aromatic organic group includes one substituted or unsubstituted aromatic ring, two or more substituted or unsubstituted aromatic rings fused together to provide a condensed ring system, or two or more substituted or unsubstituted aromatic moieties independently selected from the foregoing linked through a single bond or through a functional group selected from a fluorenylene group, —O—, —S—, —C(=O)—, —CH(OH)—, $—S(=O)_2—$, $—Si(CH_3)_2—$, $—(CH_2)_p—$ wherein $1 \le p \le 10$, $—(CF_2)_q—$ wherein $1 \le q \le 10$, $—C(CH_3)_2—$, $—C(CF_3)_2—$, —C(=O)NH—, a substituted or unsubstituted C3 to C10 cycloalkylene group, a substituted or unsubstituted C6 to C15 arylene group, and a combination thereof.

As described above, in a conventional method for preparing a polyimide containing an amide structural unit, an amide structural unit may first be prepared by a reaction of a dicarbonyl compound and a diamine, and then an additional diamine and a dianhydride compound are added to the reactor to prepare an amic acid structural unit, as well as a polyimide by linking the amide structural unit and the amic acid structural unit. Meanwhile, in the process of preparing the amide structural unit, there is a problem that a by-product, such as, halogenated hydrogen (HX: 'H' indicates hydrogen, and 'X' indicates halogen), for example, hydrogen chloride (HCl), is produced. The hydrogen chloride by-product causes corrosion of an element of an apparatus, and thus, should necessarily be removed by a precipitation process. In order to remove the by-product, an HX scavenger, such as a tertiary amine, may be added to the reactor, whereby a salt of HX is produced (please see Reaction Scheme 1 below). If the produced salt of HX is not removed and a film is produced therefrom, serious deterioration of optical properties of the produced film occurs. Therefore, a precipitation process to remove the salt of HX is required in the conventional method for preparing a polyimide containing an amide structural unit. The precipitation process increases total process time and cost, while reducing the yield of the final polyimide produced therefrom.

Reaction Scheme 1

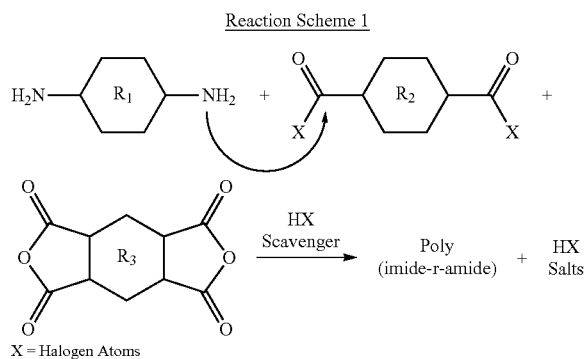

X = Halogen Atoms

The inventors have confirmed that, in addition to using the conventional method including the precipitation process as described above, it is also possible to prepare a polyimide containing an amide structural unit according to an embodiment by first reacting a diamine and a dicarbonyl compound to prepare an amide structural unit-containing oligomer having amino groups at both ends thereof (hereinafter, referred to as "an amide structural unit-containing oligomer"), and then reacting the prepared amide structural unit-containing oligomer as a diamine monomer with a tetracarboxylic dianhydride to provide a polyimide. According to the new method for preparing a polyimide, the precipitation process for removing the HX salt may be omitted, and thus, not only the total process time and cost may be reduced, but also the yield of the final polyimide may increase. Further, it is also possible to obtain a polyimide including a higher amount of an amide structural unit than those prepared by using the conventional method, and thus, an article prepared from the polyimide, for example, a film, may have further improve mechanical properties, while maintaining good optical properties.

Accordingly, another embodiment provides a composition for preparing a poly(amide-imide) copolymer including an amide structural unit-containing oligomer represented by Chemical Formula 5 as a diamine monomer, which may be prepared by reacting a diamine and a dicarbonyl compound, a tetracarboxylic dianhydride represented by Chemical Formula 3 for reacting with the oligomer to provide an imide structural unit, and as an additional diamine, a diamine represented by Chemical Formula 1 for reacting with the tetracarboxylic dianhydride represented by Chemical Formula 3 to provide an imide structural unit.

The diamine represented by Chemical Formula 5 may be prepared by reacting a dicarbonyl compound represented by Chemical Formula 4 in which $R^3$ is a substituted or unsubstituted phenylene group, and a diamine represented by Chemical Formula 2 in which $R^2$ is represented by Chemical Formula 6, wherein the diamine represented by Chemical Formula 2 may be added in a greater amount than the dicarbonyl compound represented by Chemical Formula 4 to provide an oligomer having amino groups at both ends thereof. In this case, there may be a remaining diamine that does not react with the dicarbonyl compound, which may also be represented by Chemical Formula 5, wherein n0 is 0 (zero). Accordingly, the diamine represented by Chemical Formula 5 wherein n0 is 0 may also be reacted with a tetracarboxylic dianhydride represented by Chemical Formula 3 along with the diamine represented by Chemical Formula 5 wherein n0 is greater than or equal to 1 to prepare an imide structural unit.

Meanwhile, when preparing a polyimide according to an embodiment, the diamine represented by Chemical Formula 1 may not be homogeneously mixed with the other components, i.e., for example, the diamine represented by Chemical Formula 2, the tetracarboxylic dianhydride represented by Chemical Formula 3, the dicarbonyl compound represented by Chemical Formula 4, and/or the diamine represented by Chemical Formula 5. In this case, a homogeneous chemical reaction between the diamine represented by Chemical Formula 1 and other components may not be performed, and thus, in order to prevent this, the diamine represented by Chemical Formula 1 may be pre-reacted with the tetracarboxylic dianhydride represented by Chemical Formula 3 that exists in a stoichiometric excess in a co-solvent including a solvent that dissolves the diamine represented by Chemical Formula 1, for example, THF (tetrahydrofuran), and a solvent that dissolves the tetracarboxylic dianhydride represented by Chemical Formula 3, for example, DMAc (N,N-dimethyl acetamide) to cap at least one end of the diamine represented by Chemical Formula 1 with an anhydride. Thus prepared the diamine having an anhydride-capped end may be well mixed with the other components to perform a homogeneous chemical reaction for preparing a polyimide according to an embodiment. However, this method is only an example, and persons skilled in the art to which the invention pertains would apparently understand that there may be other various methods for preparing a polyimide according to an embodiment by mixing the diamine represented by Chemical Formula 1 with the other reaction components to form an imide and/or an amide structural unit.

In the composition according to an embodiment, the diamine represented by Chemical Formula 1, the diamine represented by Chemical Formula 2, and the tetracarboxylic dianhydride represented by Chemical Formula 3 are the same as those described above for the polyimide according to an embodiment, and thus, a more detailed explanation for the compounds are omitted here.

After preparing a polyimide from the composition, an article may be formed from the polyimide through a dry-wet method, a dry method, or a wet method, but is not limited thereto. When the article is a film, it may be manufactured using a solution including the composition through the dry-wet method, wherein a layer is formed by extruding the solution of the composition from a mouth piece on a supporter, such as drum or an endless belt, drying the layer, and evaporating the solvent from the layer until the layer has a self-maintenance property. The drying may be performed by heating, for example, from about 25° C. to about 150° C., within about 1 hour or less. Then, the dried layer may be heated from the room temperature to about 250° C. or to about 300° C., and then be allowed to stand at the heated temperature for about 5 minutes to about 30 minutes at a heating rate of about 10° C. per minute, to obtain a polyimide-based film.

When the surface of the drum and/or the endless belt used for the drying process becomes flat, a layer with a flat surface is formed. The layer obtained after the drying process is delaminated from the supporter, and subjected to a wet process, desalted, and/or desolventized. The manufacturing of the film is completed after the layer is elongated, dried, and/or heat treated. The heat treatment may be performed at about 200° C. to about 500° C., for example, at about 250° C. to about 400° C., for several seconds to several minutes. After the heat treatment, the layer may be cooled slowly, for example, at a cooling rate of less than or equal to about 50° C. per minute.

The layer may be formed as a single layer or multiple layers.

When prepared as a film, the film may have a yellowness index (YI) of less than or equal to 2.2 at a thickness of about 35 micrometers (μm) to about 100 μm according to an ASTM D1925 method, and a light transmittance of greater than or equal to 89% in a wavelength range of 350 nm to 750 nm. Further, a refractive index is of less than 1.64, which proves very good optical properties. In addition, a toughness of the film may be greater than or equal to 2,000 Joul·m$^-$$_3$·10$^4$, which proves good mechanical properties.

That is, the article may maintain excellent optical properties of a polyimide, such as, for example, a low YI and a high light transmittance, while maintaining a low refractive index and high toughness, and thus, may be advantageous for a use as a window film for a flexible display device.

Hereafter, the technology of this disclosure is described in detail with reference to examples. The following examples and comparative examples are not restrictive but are illustrative only.

EXAMPLES

Synthesis Example 1: Preparation of an Oligomer Containing 70 Mol % of an Amide Structural Unit as a Diamine Monomer An amide structural unit-containing oligomer, as a diamine monomer, is prepared by reacting TPCl and 2,2'-bis(trifluoromethyl)benzidine (TFDB), in accordance with Reaction Scheme 2:

Reaction Scheme 2

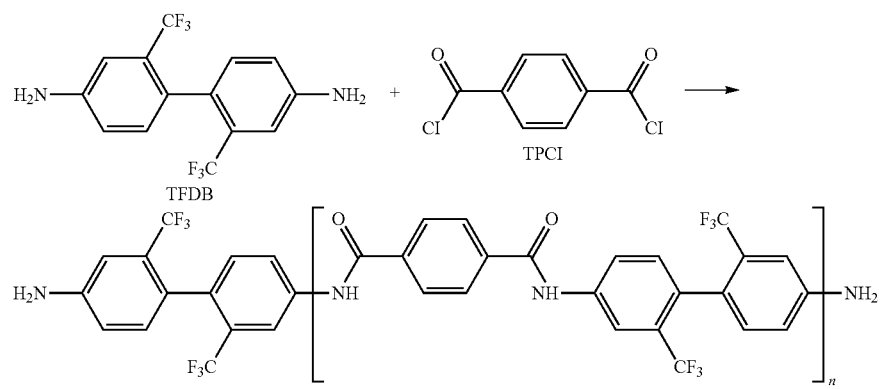

That is, 1 mole equivalent (0.122 mole, 39.2 grams) of 2,2'-bis(trifluoromethyl)benzidine (TFDB) and 2.8 mole equivalent (0.343 mole, 27.11 grams, g) of pyridine are dissolved in 700 g of N,N-dimethyl acetamide (DMAc) as a solvent in a round-bottomed flask, and 50 milliliters (mL) of DMAC is further added to the flask to dissolve the remaining TFDB. Then, 0.7 mole equivalent (0.086 mole, 17.4 g) of terephthaloyl chloride (TPCl) is divided into 4 portions, which are individually added, each portion at a time, to be mixed with the TFDB solution. The mixture is then vigorously stirred and reacted for 15 minutes at room temperature.

The resultant solution is further stirred under a nitrogen atmosphere for 2 hours, and then added to 7 liters of water containing 350 g of NaCl. The resulting mixture is stirred for 10 minutes. Subsequently, a solid produced therein is filtered, re-suspended twice, and then re-filtered by using 5 liters (L) of deionized water. The water remaining in the final product on the filter is removed as much as possible by thoroughly pressing the filtered precipitate on a filter. The precipitate is then dried at 90° C. under vacuum for 48 hours, to obtain an amide structural unit-containing oligomer represented in Reaction Scheme 2, as a diamine monomer, as a final product. The prepared oligomer containing 70 mol % of amide structural unit has a number average molecular weight of about 997 grams per mole (gram/mole).

Examples and Comparative Example: Preparation of Polyimide Films

Example 1

59.6 grams of N,N-dimethyl acetamide (DMAc) as a solvent is charged into a 4-neck double-walled 250 mL reactor, equipped with a mechanical stirrer and a nitrogen inlet, and is heated to 25° C. Then, 3.46 grams (0.0024 moles) of the 70 mol % of amide structural unit-containing oligomer prepared in Synthesis Example 1, and 3.46 g (0.011 mol) of 2,2'-bis(trifluoromethyl)benzidine (TFDB) are added thereto and dissolved, and the temperature is set to 25° C. Subsequently, 3.97 g (0.0046 mol) of aminopropyl terminated polydimethyl siloxane, DMS-A11 (Gelest, Inc.), is added to 23 g of THF (tetrahydrofuran) to dissolve. Then, 1.57 grams (0.0053 moles) of 3,3',4,4'-biphenyltetracarboxylic dianhydride (BPDA), and 5.54 grams (0.0125 moles) of 2,2-bis-(3,4-dicarboxyphenyl)hexafluoropropane dianhydride) (6FDA) are added thereto, and the mixture is stirred for 48 hours. Then, 1.4 grams of pyridine and 5 grams of acetic anhydride are added thereto, and the mixture is stirred for 24 hours to obtain a poly(amic acid-amide) copolymer solution, of which the solid content is 16.8 weight %.

After cooling the poly(amic acid-amide) copolymer solution to a temperature of 25° C., the solution is casted on a glass substrate, and dried for 40 minutes on a hot plate at a temperature of 80° C. Then, the film is separated from the glass substrate and introduced into a furnace, wherein the temperature is increased from the room temperature to 230° C., at a heating rate of 10° C. per minutes, maintained at 230° C. for about 20 minutes, and slowly cooled to room temperature to obtain a poly(amide-imide) copolymer film.

Example 2

58 grams of N,N-dimethyl acetamide (DMAc) as a solvent is charged into a 4-neck double-walled 250 mL reactor, equipped with a mechanical stirrer and a nitrogen inlet, and is heated to 25° C. Then, 5.7 g (0.018 moles) of 2,2'-bis(trifluoromethyl)benzidine (TFDB) is added thereto and dissolved, and the temperature is set to 25° C. Subsequently, 3.9 g (0.0045 moles) of aminopropyl terminated polydimethyl siloxane, DMS-A11 (Gelest, Inc.), is added to 26 g of THF (tetrahydrofuran) to dissolve. Then, 1.97 grams (0.0067 moles) of 3,3',4,4'-biphenyltetracarboxylic dianhydride (BPDA), and 6.94 grams (0.0156 moles) of 2,2-bis-(3,4-dicarboxyphenyl)hexafluoropropane dianhydride) (6FDA) are added thereto, and the mixture is stirred for 48 hours. Then, 1.8 grams of pyridine and 6.8 grams of acetic anhydride are added thereto, and the mixture is stirred for 24 hours to obtain a polyamic acid copolymer solution, of which the solid content is 17 weight %.

After cooling the polyamic acid solution to a temperature of 25° C., the solution is casted on a glass substrate, and dried for 40 minutes on a hot plate at a temperature of 80° C. Then, the film is separated from the glass substrate and introduced into a furnace, wherein the temperature is increased from the room temperature to 230° C., at a heating rate of 10° C. per minutes, maintained at 230° C. for about 20 minutes, and slowly cooled to room temperature to obtain a polyimide film.

Comparative Example 1

82 grams of N,N-dimethyl acetamide (DMAc) as a solvent is charged into a 4-neck double-walled 250 mL reactor, equipped with a mechanical stirrer and a nitrogen inlet, and is heated to 25° C. Then, 5.1 grams (0.0036 moles) of the 70 mol % of amide structural unit-containing oligomer prepared in Synthesis Example 1, and 5.1 g (0.0159 mol) of 2,2'-bis(trifluoromethyl)benzidine (TFDB) are added thereto and dissolved, and the temperature is set to 25° C. Then, 1.72 grams (0.0059 moles) of 3,3',4,4'-biphenyltetracarboxylic dianhydride (BPDA), and 6.1 grams (0.0137 moles) of 2,2-bis-(3,4-dicarboxyphenyl)hexafluoropropane dianhydride) (6FDA) are added thereto, and the mixture is stirred for 48 hours. Then, 1.5 grams of pyridine and 6 grams of acetic anhydride are added thereto, and the mixture is stirred for 24 hours to obtain a poly(amic acid-amide) copolymer solution, of which the solid content is 16.7 weight %.

After cooling poly(amic acid-amide) copolymer solution to a temperature of 25° C., the solution is casted on a glass substrate, and dried for 40 minutes on a hot plate at a temperature of 80° C. Then, the film is separated from the glass substrate and introduced into a furnace, wherein the temperature is increased from the room temperature to 230° C., at a heating rate of 10° C. per minutes, maintained at 230° C. for about 20 minutes, and slowly cooled to room temperature to obtain a poly(amide-imide) copolymer film.

Comparative Example 2

59 grams of N,N-dimethyl acetamide (DMAc) as a solvent is charged into a 4-neck double-walled 250 mL reactor, equipped with a mechanical stirrer and a nitrogen inlet, and is heated to 25° C. Then, 3.1 grams (0.0022 moles) of the 70 mol % of amide structural unit-containing oligomer prepared in Synthesis Example 1, and 3.1 g (0.098 mol) of 2,2'-bis(trifluoromethyl)benzidine (TFDB) are added thereto and dissolved, and the temperature is set to 25° C. Subsequently, 4.78 g (0.0055 moles) of aminopropyl terminated polydimethyl siloxane, DMS-A11 (Gelest, Inc.), is added to 23 g of THF (tetrahydrofuran) to dissolve. Then, 1.54 grams (0.0052 moles) of 3,3',4,4'-biphenyltetracarboxylic dianhydride (BPDA), and 5.4 grams (0.0122 moles) of 2,2-bis-(3,4-dicarboxyphenyl)hexafluoropropane dianhydride) (6FDA) are added thereto, and the mixture is stirred for 48 hours. Then, 1.4 grams of pyridine and 5 grams of acetic anhydride are added thereto, and the mixture is stirred for 24 hours to obtain a poly(amic acid-amide) copolymer solution, of which the solid content is 16.9 weight %.

After cooling the poly(amic acid-amide) solution to a temperature of 25° C., the solution is casted on a glass substrate, and dried for 40 minutes on a hot plate at a temperature of 80° C. Then, the film is separated from the glass substrate and introduced into a furnace, wherein the temperature is increased from the room temperature to 230° C., at a heating rate of 10° C. per minutes, maintained at 230° C. for about 20 minutes, and slowly cooled to room temperature to obtain a poly(amide-imide) copolymer film.

Comparative Example 3

59 grams of N,N-dimethyl acetamide (DMAc) as a solvent is charged into a 4-neck double-walled 250 mL reactor, equipped with a mechanical stirrer and a nitrogen inlet, and is heated to 25° C. Then, 11.7 grams (0.0083 moles) of the 70 mol % of amide structural unit-containing oligomer prepared in Synthesis Example 1 is added thereto and dissolved, and the temperature is set to 25° C. Then, 0.73 grams (0.0025 moles) of 3,3',4,4'-biphenyltetracarboxylic dianhydride (BPDA), and 2.57 grams (0.0058 moles) of 2,2-bis-(3,4-dicarboxyphenyl)hexafluoropropane dianhydride) (6FDA) are added thereto, and the mixture is stirred for 48 hours. Then, 0.7 grams of pyridine and 2.5 grams of acetic anhydride are added thereto, and the mixture is stirred for 24 hours to obtain a poly(amic acid-amide) copolymer solution, of which the solid content is 14.5 weight %.

After cooling the poly(amic acid-amide) solution to a temperature of 25° C., the solution is casted on a glass substrate, and dried for 40 minutes on a hot plate at a temperature of 100° C. Then, the film is separated from the glass substrate and introduced into a furnace, wherein the temperature is increased from the room temperature to 230° C., at a heating rate of 10° C. per minutes, maintained at 230° C. for about 20 minutes, and slowly cooled to room temperature to obtain a poly(amide-imide) copolymer film.

Comparative Example 4

62 grams of N,N-dimethyl acetamide (DMAc) as a solvent is charged into a 4-neck double-walled 250 mL reactor, equipped with a mechanical stirrer and a nitrogen inlet, and is heated to 25° C. Then, 12 grams (0.0084 moles) of the 70 mol % of amide structural unit-containing oligomer prepared in Synthesis Example 1 is added thereto and dissolved, and the temperature is set to 25° C. Subsequently, 1.8 g (0.0021 moles) of aminopropyl terminated polydimethyl siloxane, DMS-A11 (Gelest, Inc.), is added to 21 g of THF (tetrahydrofuran) to dissolve. Then, 0.92 grams (0.0031 moles) of 3,3',4,4'-biphenyltetracarboxylic dianhydride (BPDA), and 3.26 grams (0.0073 moles) of 2,2-bis-(3,4-dicarboxyphenyl)hexafluoropropane dianhydride) (6FDA) are added thereto, and the mixture is stirred for 48 hours. Then, 0.8 grams of pyridine and 3.2 grams of acetic anhydride are added thereto, and the mixture is stirred for 24 hours to obtain a poly(amic acid-amide) copolymer solution, of which the solid content is 17.3 weight %.

After cooling the poly(amic acid-amide) copolymer solution to a temperature of 25° C., the solution is casted on a glass substrate, and dried for 40 minutes on a hot plate at a temperature of 80° C. Then, the film is separated from the glass substrate and introduced into a furnace, wherein the temperature is increased from the room temperature to 230° C., at a heating rate of 10° C. per minutes, maintained at 230° C. for about 20 minutes, and slowly cooled to room temperature to obtain a poly(amide-imide) copolymer film.

Comparative Example 5

80 grams of N,N-dimethyl acetamide (DMAc) as a solvent is charged into a 4-neck double-walled 250 mL reactor, equipped with a mechanical stirrer and a nitrogen inlet, and is heated to 25° C. Then, 8.9 g (0.0278 moles) of 2,2'-bis (trifluoromethyl)benzidine (TFDB) is added thereto and dissolved, and the temperature is set to 25° C. Subsequently, 2.46 grams (0.0083 moles) of 3,3',4,4'-biphenyltetracarboxylic dianhydride (BPDA), and 8.64 grams (0.0195 moles) of 2,2-bis-(3,4-dicarboxyphenyl)hexafluoropropane dianhydride) (6FDA) are added to the solution, and the mixture is stirred for 48 hours at 25° C. Then, 2.2 grams of pyridine and 8.5 grams of acetic anhydride are added thereto, and the mixture is stirred for 24 hours to obtain a polyamic acid solution, of which the solid content is 18 weight %.

After cooling down the polyamic acid solution to a temperature of 25° C., the solution is casted on a glass substrate, and dried for 40 minutes on a hot plate at a temperature of 100° C. Then, the film is separated from the glass substrate and introduced into a furnace, wherein the temperature is increased from the room temperature to 250° C., at a heating rate of 10° C. per minutes, maintained at 250° C. for about 30 minutes, and slowly cooled to room temperature to obtain a polyimide film.

Evaluation: Evaluation of mechanical and optical properties of the films

Each of the polyimide films prepared in Examples 1 and 2 and Comparative Examples 1 to 5 are evaluated for mechanical and optical properties, and the obtained values are described in Table 1 below.

Particularly, a light transmittance, YI, toughness, and refractive index are measured.

Yellowness index (YI), and light transmittance (Tra.) at a wavelength range of 350 nanometers (nm) to 760 nm are measured for a film having a thickness of about 50 micrometers, according to an ASTM D1925 method by using a spectrophotometer, CM-3600d made by Konica Minolta Inc.

Toughness is measured according to an ASTM D882 method, and is determined by calculating the total area by multiplying the X axis for strain and the Y axis for stress.

Refractive index is measured by using Ellipsometer (M-2000, J.A.Woollam Co., Ltd.) in a visible ray region for the value of at 550 nanometer established by the Gen-Osc model.

TABLE 1

| | Composition | Tra. [%] | YI @50 um | Toughness [Joule · $m^{-3} \cdot 10^4$] | Refractive index |
|---|---|---|---|---|---|
| Example 1 | TPCI/TFDB/6FDA/BPDA/DMS-A11 = 30/90/49/21/10 | 89.7 | 1.6 | 2900 | 1.59 |
| Example 2 | TPCI/TFDB/6FDA/BPDA/DMS-A11 = 0/80/70/30/20 | 91.0 | 2.2 | 2900 | 1.56 |
| Comparative Example 1 | TPCI/TFDB/6FDA/BPDA/DMS-A11 = 30/100/49/21/0 | 89.6 | 1.7 | 2000 | 1.65 |
| Comparative Example 2 | TPCI/TFDB/6FDA/BPDA/DMS-A11 = 30/75/49/21/25 | 90.3 | 2.4 | 380 | 1.55 |
| Comparative Example 3 | TPCI/TFDB/6FDA/BPDA/DMS-A11 = 70/100/21/9/0 | 89.0 | 1.9 | 2200 | 1.69 |
| Comparative Example 4 | TPCI/TFDB/6FDA/BPDA/DMS-A11 = 70/80/21/9/20 | 89.6 | 2.3 | 1400 | 1.66 |
| Comparative Example 5 | TPCI/TFDB/6FDA/BPDA/DMS-A11 = 0/100/70/30/0 | 90.1 | 1.7 | 1900 | 1.64 |

As shown in Table 1, the films according to Examples 1 and 2 have light transmittances of greater than or equal to 89%, YIs of less than or equal to 2.2, toughness of greater than or equal to 2,000 Joul·m$^{-3}$·10$^4$, and refractive indices of less than 1.64, i.e., show good optical properties, as well as improved toughness.

On the contrary, the film according to Comparative Example 1, which has been prepared by not including the aminopropyl terminated polydimethyl siloxane, DMS-A11, as a diamine component, although the composition is the same as that of Example 1, except for not including DMS-A11, has a lower transmittance, a higher YI, a much lower toughness, and a much higher refractive index than the film according to Example 1.

The composition of the film according to Comparative Example 2 is similar to that of Example 1, except for the amount of the aminopropyl terminated polydimethyl siloxane, DMS-A11, is 25 mol %, and thus, the film according to Comparative Example 2 has a lowered refractive index and an increased transmittance, i.e., more improved optical properties than those of Example 1, but has a drastically reduced toughness, i.e., much deteriorated mechanical property.

The composition of the film according to Comparative Example 3 does not include the aminopropyl terminated polydimethyl siloxane, DMS-A11, as in Comparative Example 1, but instead, contains more than two times amount of TPCl than Comparative Example 1, and thus, while toughness of the film according to Comparative Example 3 is higher than Comparative Example 1, YI increases, transmittance decreases, and refractive index drastically increases compared with Comparative Example 1, shows generally deteriorated optical properties.

The composition of the film according to Comparative Example 4 is similar to Comparative Example 3, except for the amount of the aminopropyl terminated polydimethyl siloxane, DMS-A11, is 20 mol %, and the film according to Comparative Example 4 has a lowered refractive index and an increased transmittance compared to that of Comparative Example 3, but also has an increased YI and a reduced toughness, i.e., shows generally deteriorated optical and mechanical properties.

The composition of the film according to Comparative Example 5 is similar to Example 2, except for not including the aminopropyl terminated polydimethyl siloxane, DMS-A11, as a diamine component, and thus, the film according to Comparative Example 5 has a drastically increased refractive index and a drastically reduced toughness compared to Example 2, i.e., shows no improvement in optical and mechanical properties due to the absence of the aminopropyl terminated polydimethyl siloxane, DMS-A11.

As shown above, a polyimide film according to an embodiment is prepared by reacting an aromatic diamine, aromatic dianhydride, and optionally an aromatic dicarbonyl compound, as well as a diamine having 5 units or more of siloxane groups to which an aliphatic organic group is attached in an amount of less than 25 mol %, and if the aromatic dicarbonyl compound, for example, TPCl, is included, the amount is less than 50 mol %, and thus, the film has excellent optical properties, such as, for example, a low YI and a low refractive index, as well as improved mechanical properties, such as, for example, a high toughness. Accordingly, the polyimide film according to an embodiment is able to be advantageously used as a window film for a display device, such as, for example, a flexible display device.

While this disclosure has been described in connection with what is presently considered to be practical exemplary embodiments, it is to be understood that the present disclosure is not limited to the embodiments presented herein, but, on the contrary, is intended to cover various modifications and equivalent arrangements included within the spirit and scope of the appended claims.

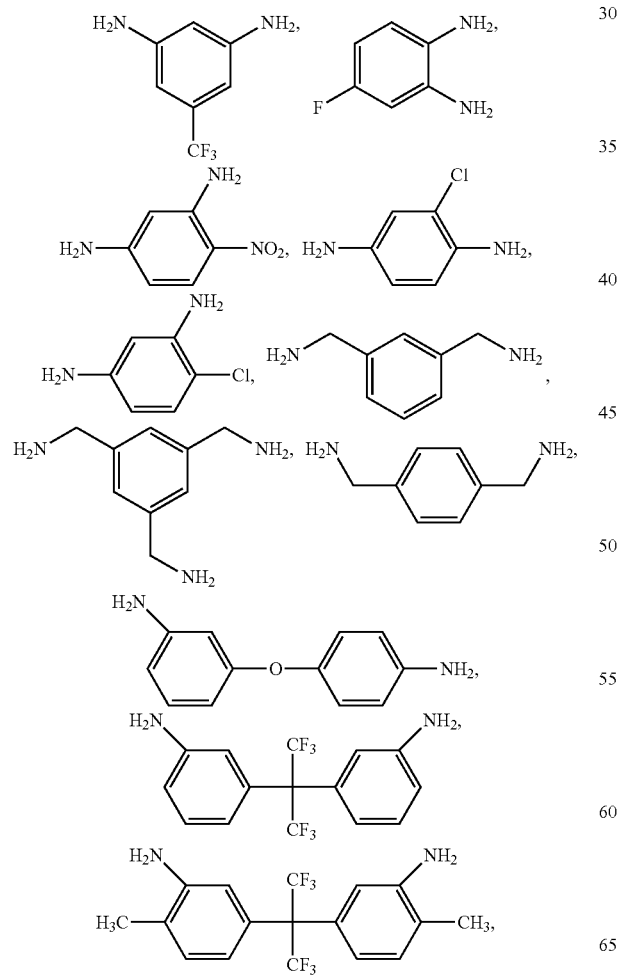
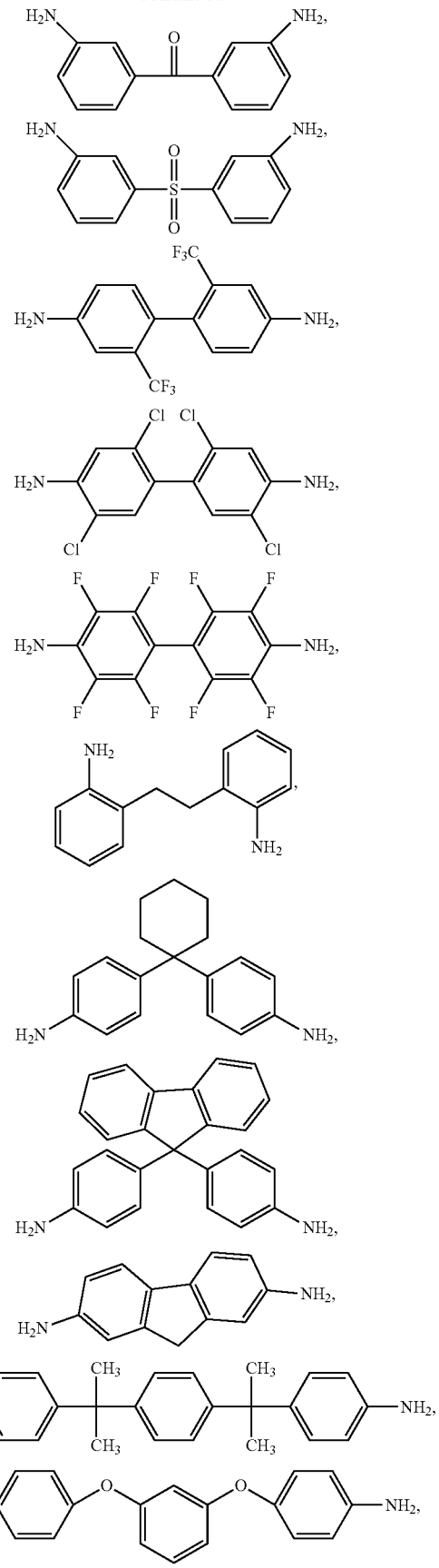

-continued
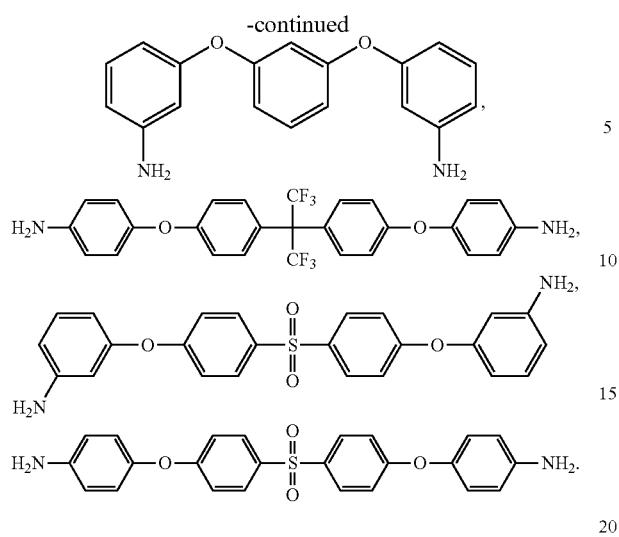

What is claimed is:

1. A polyimide that is a reaction product of a diamine represented by Chemical Formula 1, a diamine represented by Chemical Formula 2, and a tetracarboxylic dianhydride represented by Chemical Formula 3:

Chemical Formula 1

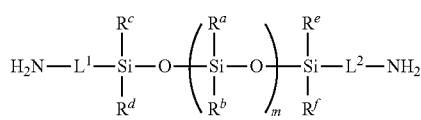

wherein in Chemical Formula 1,
$R^a$ to $R^f$ are each independently a C1 to C30 alkyl group, a C2 to C30 alkenyl group, a C2 to C30 alkynyl group, a C1 to C30 alkoxy group, a C3 to C30 cycloalkyl group, or a combination thereof, $L^1$ and $L^2$ are each independently a single bond, a C1 to C30 alkylene group, a C2 to C30 alkenylene group, a C3 to C30 cycloalkylene group, or a combination thereof, and m is an integer ranging from 3 to 135;

Chemical Formula 2 comprises at least one diamine represented by the following chemical formulae:

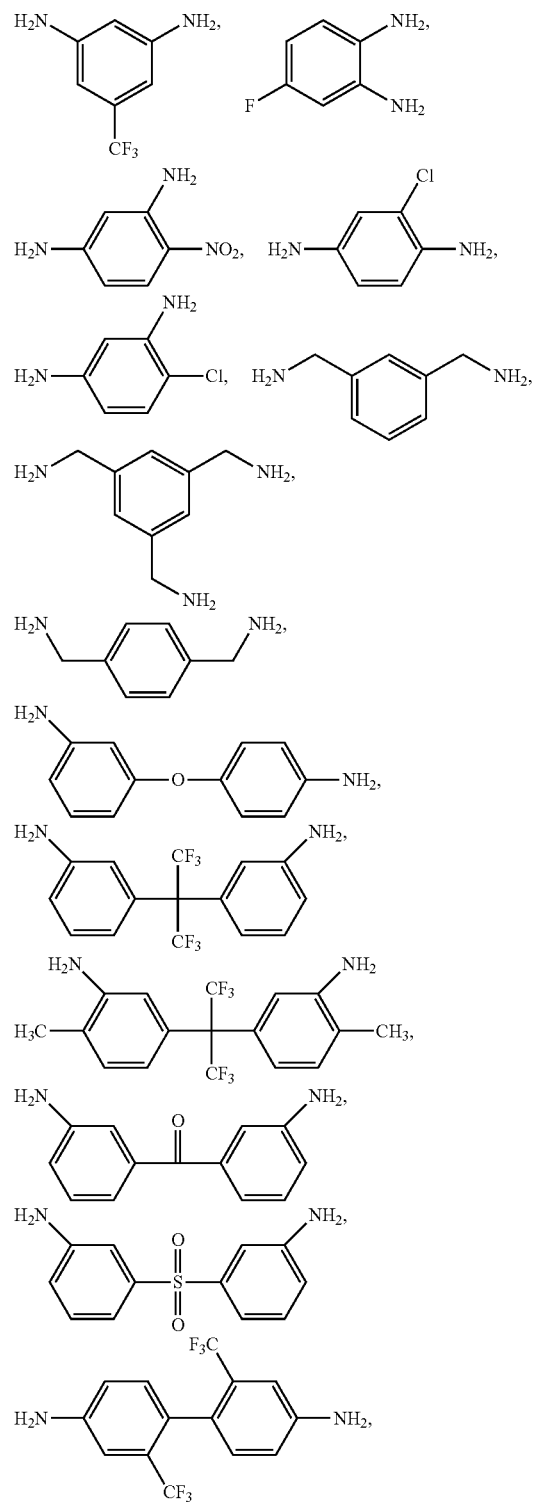

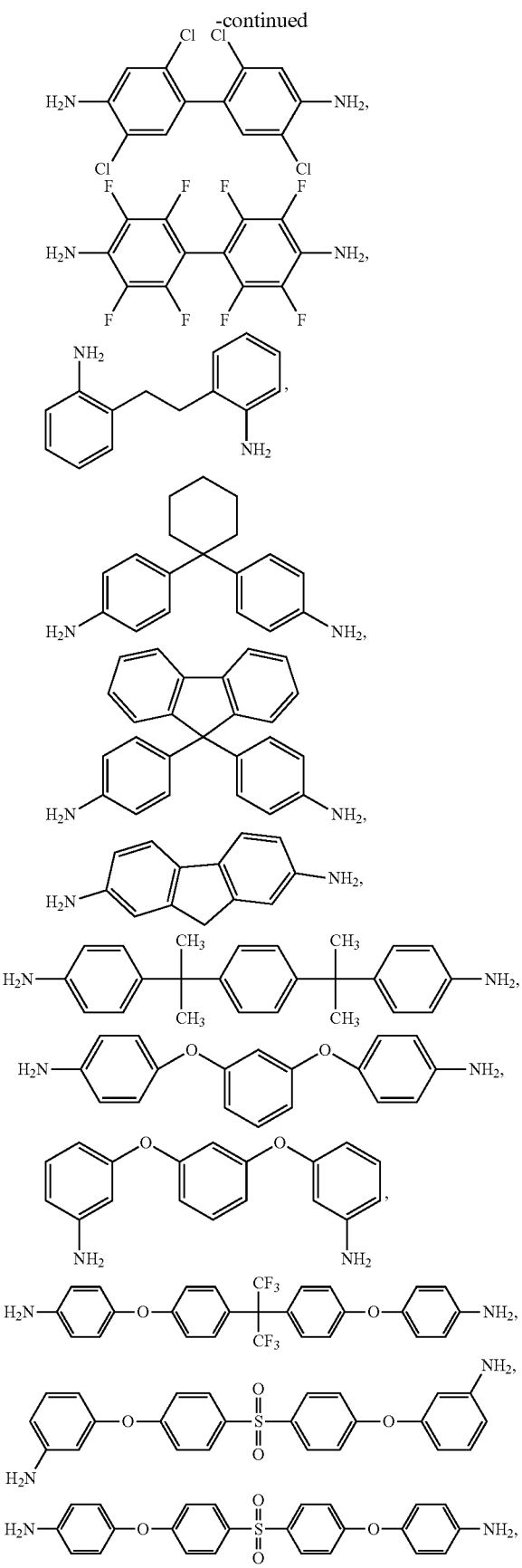

wherein the at least one diamine represented by Chemical Formula 2 includes the diamine

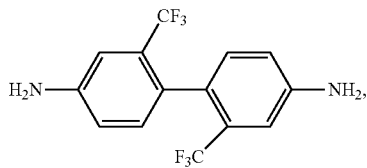

and
an amount of the diamine represented by Chemical Formula 1 is less than 25 mole percent based on the total mole number of the diamine represented by Chemical Formula 1 and the diamine represented by Chemical Formula 2;

Chemical Formula 3

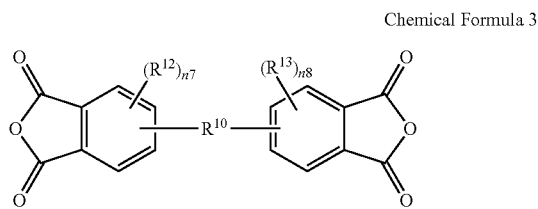

wherein, in Chemical Formula 3,
$R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein 1≤n≤10, 1≤p≤10, and 1≤q≤10,
$R^{12}$ and $R^{13}$ are each independently a halogen, a hydroxy group, a substituted or unsubstituted C1 to C10 aliphatic organic group, a C6 to C20 aromatic organic group, an alkoxy group of formula —OR$^{201}$, wherein $R^{201}$ is a C1 to C10 aliphatic organic group, or a silyl group of formula —SiR$^{210}$R$^{211}$R$^{212}$, wherein $R^{210}$, $R^{211}$, and $R^{212}$ are each independently hydrogen or a C1 to C10 aliphatic organic group, and
n7 and n8 are each independently an integer ranging from 0 to 3.

2. The polyimide according to claim 1, wherein in Chemical Formula 1, $L^1$ and $L^2$ are each independently a C1 to C30 alkylene group, and $R^a$ to $R^f$ are each independently a C1 to C30 alkyl group.

3. The polyimide according to claim 1, wherein in Chemical Formula 1, both $L^1$ and $L^2$ are propylene groups, and each of $R^a$ to $R^f$ are methyl groups.

4. The polyimide according to claim 1, wherein the tetracarboxylic dianhydride represented by Chemical Formula 3 comprises at least one selected from 3,3',4,4'-biphenyl tetracarboxylic dianhydride, 3,3',4,4'-diphenylsulfone tetracarboxylic dianhydride, 4,4'-(hexafluoroisopropylidene)diphthalic anhydride, and 4,4'-oxydiphthalic anhydride.

5. The polyimide according to claim 1, wherein the tetracarboxylic dianhydride represented by Chemical Formula 3 comprises a combination of the compound represented by Chemical Formula 3 wherein $R^{10}$ is a single bond, and both n7 and n8 are 0, and the compound represented by Chemical Formula 3 wherein $R^{10}$ is —C(C$_n$F$_{2n+1}$)$_2$— wherein 1≤n≤10, and both n7 and n8 are 0.

6. An article comprising the polyimide according to claim 1.

7. The article according to claim 6, wherein the article comprises a film, wherein the film has a toughness of greater than or equal to 2,000 Joules×reverse cubic meters×10$^4$ (Joul·m$^{-3}$·10$^4$), and a refractive index of less than 1.64, when the film has a thickness of about 35 micrometers to about 100 micrometers.

8. The article according to claim 6 comprising a refractive index of equal to or less than 1.59, and a yellowness index at 50 micrometers of equal to or less than 2.2.

9. The polyimide according to claim 1, wherein the diamine represented by Chemical Formula 1 has a number average molecular weight, determined by a Gel Permeation Chromatography (GPC), of about 500 to 3000 gram/mole, and is present in the polyimide from 1 mole percent to 20 mole percent based on the total amount of the diamine represented by Chemical Formula 1 and the diamine represented by Chemical Formula 2.

10. A polyimide that is a reaction product of a diamine represented by Chemical Formula 1, a diamine represented by Chemical Formula 2 including a diamine represented by Chemical Formula A:

Chemical Formula A

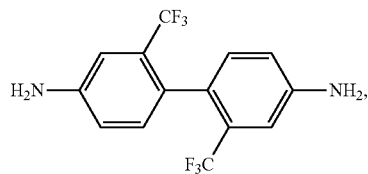

a tetracarboxylic dianhydride represented by Chemical Formula 3, and a dicarbonyl compound represented by Chemical Formula 4:

Chemical Formula 1

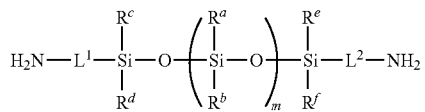

wherein in Chemical Formula 1,
R$^a$ to R$^f$ are each independently a C1 to C30 alkyl group, a C2 to C30 alkenyl group, a C2 to C30 alkynyl group, a C1 to C30 alkoxy group, a C3 to C30 cycloalkyl group, or a combination thereof,
L$^1$ and L$^2$ are each independently a single bond, a C1 to C30 alkylene group, a C2 to C30 alkenylene group, a C3 to C30 cycloalkylene group, or a combination thereof, and
m is an integer ranging from 3 to 135;

NH$_2$—R$^2$—NH$_2$ 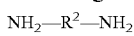 Chemical Formula 2 wherein in Chemical Formula 2,
R$^2$ comprises a substituted or unsubstituted C6 to C30 aromatic organic group, wherein the substituted or unsubstituted C6 to C30 aromatic organic group comprises one substituted or unsubstituted aromatic ring, two or more substituted or unsubstituted aromatic rings fused together to provide a condensed ring system, or two or more substituted or unsubstituted aromatic moieties independently selected from the foregoing linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O)NH—, a substituted or unsubstituted C3 to C10 cycloalkylene group, a substituted or unsubstituted C6 to C15 arylene group, and a combination thereof;
wherein an amount of the diamine represented by Chemical Formula 1 is less than 25 mole percent based on the total mole number of the diamine represented by Chemical Formula 1 and the diamine represented by Chemical Formula 2;

Chemical Formula 3

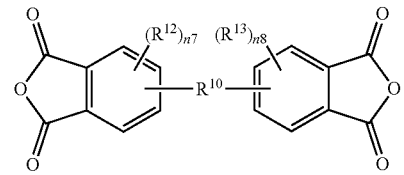

wherein, in Chemical Formula 3,
R$^{10}$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein 1≤n≤10, 1≤p≤10, and 1≤q≤10,
R$^{12}$ and R$^{13}$ are each independently a halogen, a hydroxy group, a substituted or unsubstituted C1 to C10 aliphatic organic group, a C6 to C20 aromatic organic group, an alkoxy group of formula —OR$^{201}$, wherein R$^{201}$ is a C1 to C10 aliphatic organic group, or a silyl group of formula —SiR$^{210}$R$^{211}$R$^{212}$, wherein R$^{210}$, R$^{211}$, and R$^{212}$ are each independently hydrogen or a C1 to C10 aliphatic organic group, and
n7 and n8 are each independently an integer ranging from 0 to 3; and Chemical Formula 4

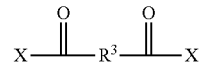

wherein, in Chemical Formula 4,
R$^3$ is a substituted or unsubstituted phenylene and/or a substituted or unsubstituted biphenylene group, and
each X is an identical or a different halogen atom.

11. The polyimide according to claim 10, wherein the diamine represented by Chemical Formula 2 further comprises at least one diamine represented by the following chemical formulae:

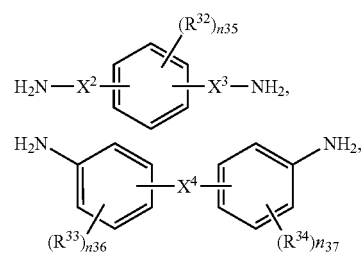

-continued

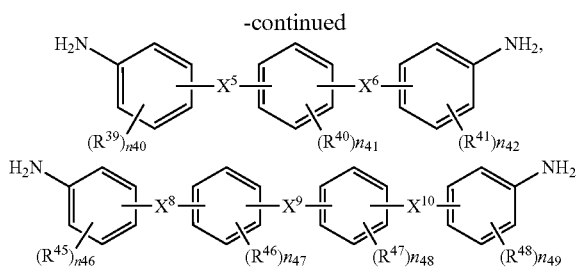

wherein in the above chemical formulae, $R^{32}$ to $R^{34}$, $R^{39}$ to $R^{41}$, and $R^{45}$ to $R^{48}$ are each independently a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 oxycycloalkyl group, a substituted or unsubstituted C6 to C15 aryl group, a substituted or unsubstituted C6 to C15 oxyaryl group, or a substituted or unsubstituted C3 to C15 heteroaryl group, $X^2$ to $X^6$, and $X^8$ to $X^{10}$ are each independently a single bond, fluorenylene group, a substituted or unsubstituted C1 to C10 alkylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— wherein $1 \leq p \leq 10$, —(CF$_2$)$_q$— wherein $1 \leq q \leq 10$, —C(CH$_3$)$_2$—, —C(CF$_3$)$_2$—, —C(=O)NH—, or a combination thereof, and n35 to n37, n40 to n42, and n46 to n49 are each independently an integer ranging from 0 to 4.

12. The polyimide according to claim 10, wherein an amount of the dicarbonyl compound represented by Chemical Formula 4 is less than or equal to 50 mole percent based on the total mole number of the tetracarboxylic dianhydride represented by Chemical Formula 3 and the dicarbonyl compound represented by Chemical Formula 4.

13. A composition for preparing a polyimide of claim 10 comprising a diamine represented by Chemical Formula 5, which is formed with the dicarbonyl compound represented by Chemical Formula 4 where $R^3$ is a substituted or unsubstituted phenylene, the diamine represented by Chemical Formula 1, and the tetracarboxylic dianhydride represented by Chemical Formula 3:

Chemical Formula 5

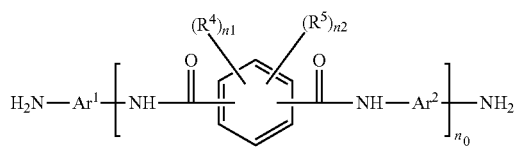

wherein, in Chemical Formula 5, $R^4$ and $R^5$ are each independently a halogen, a hydroxy group, a substituted or unsubstituted C1 to C10 alkyl group, or a substituted or unsubstituted C1 to C10 alkoxy group, n0 is an integer greater than 0, n1 and n2 are each independently an integer ranging from 0 to 4, provided that n1+n2 is an integer ranging from 0 to 4, and $Ar^1$ and $Ar^2$ are each independently represented by Chemical Formula 6:

Chemical Formula 6

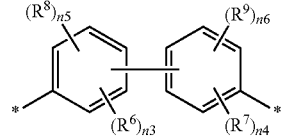

wherein, in Chemical Formula 6, $R^6$ and $R^7$ are each independently an electron withdrawing group selected from —CF$_3$, —CCl$_3$, —CBr$_3$, —CI$_3$, —NO$_2$, —CN, —C(=O)CH$_3$, and —CO$_2$C$_2$H$_5$, $R^8$ and $R^9$ are each independently a halogen, a hydroxy group, a substituted or unsubstituted C1 to C10 aliphatic organic group, a C6 to C20 aromatic organic group, an alkoxy group of formula —OR$^{204}$, wherein $R^{204}$ is a C1 to C10 aliphatic organic group, or a silyl group of formula —SiR$^{205}$R$^{206}$R$^{207}$ wherein $R^{205}$, $R^{206}$, and $R^{207}$ are each independently hydrogen or a C1 to C10 aliphatic organic group, n3 is an integer ranging from 1 to 4, n5 is an integer ranging from 0 to 3, provided that n3+n5 is an integer ranging from 1 to 4, and n4 is an integer ranging from 1 to 4, n6 is an integer ranging from 0 to 3, provided that n4+n6 is an integer ranging from 1 to 4.

14. The composition of claim 13, wherein the diamine represented by Chemical Formula 2 further comprises at least one diamine represented by the following chemical formulae:

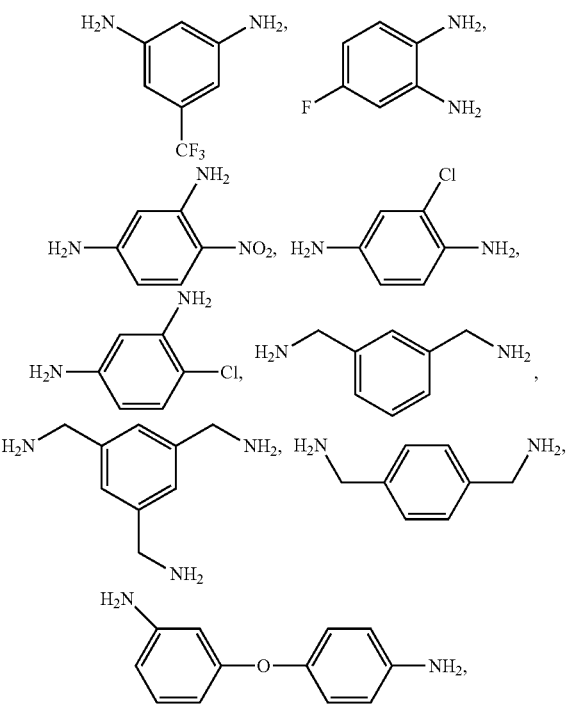

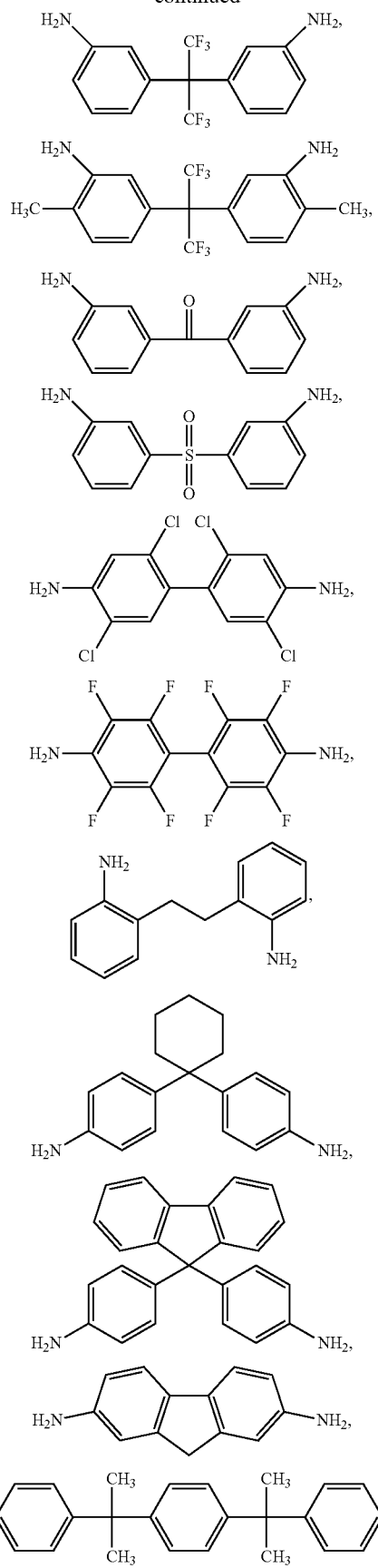

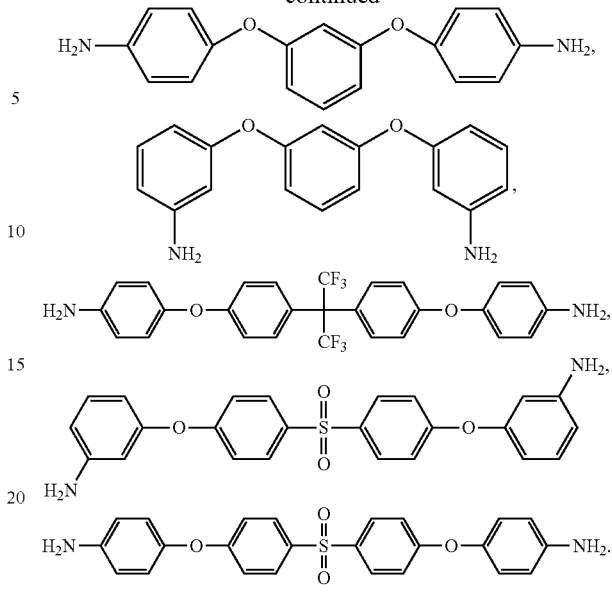

15. The composition for preparing a polyimide according to claim 13, wherein the tetracarboxylic dianhydride represented by Chemical Formula 3 comprises a combination of the compound represented by Chemical Formula 3 wherein $R^{10}$ is single bond, and both n7 and n8 are 0, and the compound represented by Chemical Formula 3 wherein $R^{10}$ is $-C(C_nF_{2n+1})_2-$ wherein $1 \leq n \leq 10$, and both n7 and n8 are 0.

16. The composition for preparing a polyimide according to claim 13, wherein, in Chemical Formula 5, both n1 and n2 are zero, and wherein, in Chemical Formula 6, both $R^6$ and $R^7$ are $-CF_3$, both n3 and n4 are 1, and both n5 and n6 are zero.

17. The polyimide according to claim 10 comprising an amide structural unit of Chemical Formula 7

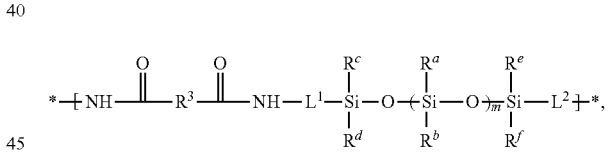

wherein in Chemical Formula 7,
$R^3$ is the same as defined for Chemical Formula 4, and $R^a$ to $R^f$, $L^1$ and $L^2$, and m are the same as defined for Chemical Formula 1.

18. A display device including an article comprising a polyimide that is a reaction product of a diamine represented by Chemical Formula 1, a diamine represented by Chemical Formula 2 including a diamine represented by Chemical Formula A:

Chemical Formula A

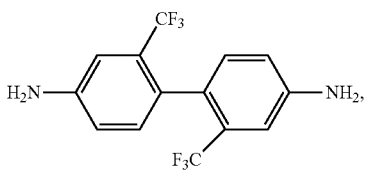

and
a tetracarboxylic dianhydride represented by Chemical Formula 3:

Chemical Formula 1

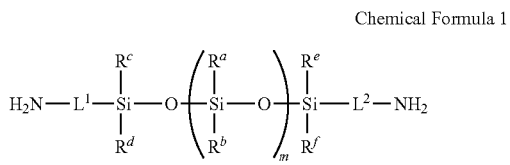

wherein in Chemical Formula 1,
$R^a$ to $R^f$ are each independently a C1 to C30 alkyl group, a C2 to C30 alkenyl group, a C2 to C30 alkynyl group, a C1 to C30 alkoxy group, a C3 to C30 cycloalkyl group, or a combination thereof,
$L^1$ and $L^2$ are each independently a single bond, a C1 to C30 alkylene group, a C2 to C30 alkenylene group, a C3 to C30 cycloalkylene group, or a combination thereof, and
m is an integer ranging from 3 to 135;

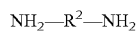 Chemical Formula 2 wherein in Chemical Formula 2,
$R^2$ comprises a substituted or unsubstituted C6 to C30 aromatic organic group, wherein the substituted or unsubstituted C6 to C30 aromatic organic group comprises one substituted or unsubstituted aromatic ring, two or more substituted or unsubstituted aromatic rings fused together to provide a condensed ring system, or two or more substituted or unsubstituted aromatic moieties independently selected from the foregoing linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O)NH—, a substituted or unsubstituted C3 to C10 cycloalkylene group, a substituted or unsubstituted C6 to C15 arylene group, and a combination thereof;
wherein an amount of the diamine represented by Chemical Formula 1 is less than 25 mole percent based on the total mole number of the diamine represented by Chemical Formula 1 and the diamine represented by Chemical Formula 2;

Chemical Formula 3

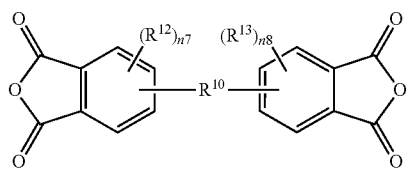

wherein, in Chemical Formula 3,
$R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein 1≤n≤10, 1≤p≤10, and 1≤q≤10
$R^{12}$ and $R^{13}$ are each independently a halogen, a hydroxy group, a substituted or unsubstituted C1 to C10 aliphatic organic group, a C6 to C20 aromatic organic group, an alkoxy group of formula —OR$^{201}$, wherein R$^{201}$ is a C1 to C10 aliphatic organic group, or a silyl group of formula —SiR$^{210}$R$^{211}$R$^{212}$, wherein R$^{210}$, R$^{211}$, and R$^{212}$ are each independently hydrogen or a C1 to C10 aliphatic organic group, and
n7 and n8 are each independently an integer ranging from 0 to 3.
19. A polyimide that is a reaction product of a diamine represented by Chemical Formula 1, a diamine represented by Chemical Formula 2, and a tetracarboxylic dianhydride represented by Chemical Formula 3:
Chemical Formula 1

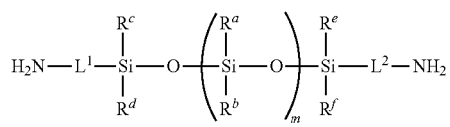

wherein in Chemical Formula 1,
$R^a$ to $R^f$ are each independently a C1 to C30 alkyl group, a C2 to C30 alkenyl group, a C2 to C30 alkynyl group, a C1 to C30 alkoxy group, a C3 to C30 cycloalkyl group, or a combination thereof,
$L^1$ and $L^2$ are each independently a single bond, a C1 to C30 alkylene group, a C2 to C30 alkenylene group, a C3 to C30 cycloalkylene group, or a combination thereof, and
m is an integer ranging from 3 to 135;

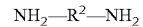 Chemical Formula 2 wherein in Chemical Formula 2,
$R^2$ comprises a substituted or unsubstituted C6 to C30 aromatic organic group, wherein the substituted or unsubstituted C6 to C30 aromatic organic group comprises one substituted or unsubstituted aromatic ring, two or more substituted or unsubstituted aromatic rings fused together to provide a condensed ring system, or two or more substituted or unsubstituted aromatic moieties independently selected from the foregoing linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O)NH—, a substituted or unsubstituted C3 to C10 cycloalkylene group, a substituted or unsubstituted C6 to C15 arylene group, and a combination thereof;
wherein an amount of the diamine represented by Chemical Formula 1 is less than 25 mole percent based on the total mole number of the diamine represented by Chemical Formula 1 and the diamine represented by Chemical Formula 2;

Chemical Formula 3

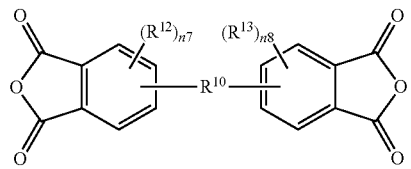

wherein, in Chemical Formula 3, $R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein $1 \leq n \leq 10$, $1 \leq p \leq 10$, and $1 \leq q \leq 10$, $R^{12}$ and $R^{13}$ are each independently a halogen, a hydroxy group, a substituted or unsubstituted C1 to C10 aliphatic organic group, a C6 to C20 aromatic organic group, an alkoxy group of formula —OR$^{201}$, wherein $R^{201}$ is a C1 to C10 aliphatic organic group, or a silyl group of formula —SiR$^{210}$R$^{211}$R$^{212}$, wherein $R^{210}$, $R^{211}$, and $R^{212}$ are each independently hydrogen or a C1 to C10 aliphatic organic group, and n7 and n8 are each independently an integer ranging from 0 to 3, wherein the tetracarboxylic dianhydride represented by Chemical Formula 3 comprises a combination of the compound wherein $R^{10}$ is a single bond, and both n7 and n8 are 0, and the compound wherein $R^{10}$ is —C(C$_n$F$_{2n+1}$)$_2$— wherein $1 \leq n \leq 10$, and both n7 and n8 are 0.

20. The polyimide according to claim 19, wherein the diamine represented by Chemical Formula 2 comprises at least one selected from the diamines represented by the following chemical formulae: